(12) United States Patent
Gupta et al.

(10) Patent No.: US 7,814,112 B2
(45) Date of Patent: Oct. 12, 2010

(54) DETERMINING RELEVANCY AND DESIRABILITY OF TERMS

(75) Inventors: Raghav Gupta, Sunnyvale, CA (US); Sichun Xu, Mountain View, CA (US)

(73) Assignee: eBay Inc., San Jose, CA (US)

(*) Notice: Subject to any disclaimer, the term of this patent is extended or adjusted under 35 U.S.C. 154(b) by 350 days.

(21) Appl. No.: 11/679,973

(22) Filed: Feb. 28, 2007

(65) Prior Publication Data

US 2007/0288433 A1    Dec. 13, 2007

Related U.S. Application Data

(60) Provisional application No. 60/804,426, filed on Jun. 9, 2006, provisional application No. 60/804,506, filed on Jun. 12, 2006.

(51) Int. Cl.
*G06F 17/30* (2006.01)

(52) U.S. Cl. .............. 707/758; 707/748; 707/752; 707/E17.071

(58) Field of Classification Search ............ 707/1–7, 707/E17.071, 999.003, 758, 748, 752
See application file for complete search history.

(56) References Cited

U.S. PATENT DOCUMENTS

| | | | |
|---|---|---|---|
| 6,205,456 B1 | 3/2001 | Nakao | |
| 6,393,389 B1 | 5/2002 | Chanod et al. | |
| 6,490,577 B1 * | 12/2002 | Anwar | 707/3 |
| 6,785,676 B2 | 8/2004 | Oblinger | |
| 6,901,399 B1 | 5/2005 | Corston et al. | |

(Continued)

FOREIGN PATENT DOCUMENTS

GB    2366033    2/2002

(Continued)

OTHER PUBLICATIONS

Buyukkokten, O. , et al., "Efficient web browsing on handheld devices using page and form summarization", *ACM Transactions on Information Systems*, 20(1), (2002),82-115.

(Continued)

*Primary Examiner*—Tim T. Vo
*Assistant Examiner*—Shiow-Jy Fan
(74) *Attorney, Agent, or Firm*—Schwegman, Lundberg & Woessner, P.A.

(57) ABSTRACT

A system and method to sort search results based upon a desirability value is illustrated. This desirability value may be based upon the difference between a demand value and a supply value. Demand may be based upon user activity such as click-throughs, purchases, price, or location. Supply may be based upon a supply of keywords that may be the number of times a word is used in search or item title. The system and method may include receiving a search query, associating a first numerical value with a keyword that is a part of the search query, tracking user activity associated with the keyword, associating a second numerical value with the keyword based upon the user activity, finding a difference value between the first and second numerical values, associating this difference value with the keyword, sorting keywords based upon the difference values, and returning the search results of the sorting.

24 Claims, 17 Drawing Sheets

U.S. PATENT DOCUMENTS

| | | | |
|---|---|---|---|
| 2003/0040850 | A1 | 2/2003 | Najmi et al. |
| 2003/0144868 | A1 | 7/2003 | MacIntyre et al. |
| 2004/0181604 | A1 | 9/2004 | Immonen |
| 2005/0039136 | A1 | 2/2005 | Othmer |
| 2005/0097204 | A1 | 5/2005 | Horowitz et al. |
| 2005/0192992 | A1 | 9/2005 | Reed et al. |
| 2006/0031340 | A1 | 2/2006 | Mathew et al. |
| 2008/0306938 | A1 | 12/2008 | Johnson et al. |
| 2009/0006179 | A1 | 1/2009 | Billingsley et al. |

FOREIGN PATENT DOCUMENTS

| | | |
|---|---|---|
| WO | WO-2009/002549 | 12/2008 |

OTHER PUBLICATIONS

Chan, Susy, et al., "Useability for mobile commerce across multiple form factors", *Journal of Electronic Commerce Research*, 3(3), (2002),187-199.

Hassel, Martin, et al., "SweSum—Automatic Text Summarizer", http://swesum.nada.kth.se/index-eng.html, (2005).

Yang, Christopher, et al., "Fractal Summarization for Mobile Devices to Access Large Documents on the Web", *Proceedings International WWW Conference*, Budapest, Hungary.,(2003).

U.S. Appl. No. 11/821,928, Preliminary Amendment filed Jun. 26, 2008, 7 pgs.

International Application Serial No. PCT/US2008/08024, Search Report and Written Opinion mailed on Oct. 1, 2008, 10 pgs.

* cited by examiner

DETERMINING RELEVANCY AND DESIRABILITY OF TERMS

CROSS REFERENCE TO RELATED APPLICATIONS

This is a non-provisional patent application claiming priority under 35 USC §119(e) to U.S. Provisional Patent Application No. 60/804,426 entitled "RELEVANCE SEARCH" that was filed on Jun. 9, 2006, and U.S. Provisional Patent Application No. 60/804,506 filed on Jun. 12, 2006 entitled "TEXT SUMMARIZATION BASED ON THE CONTEXTUAL RELEVANCE OF TERMS" both of which are incorporated by reference in their entirety.

TECHNICAL FIELD

The present application relates generally to the technical field of commercial uses of search algorithms implemented on a computer.

BACKGROUND

Search algorithms are used to search for different types of data including text. This text may be in to the form strings of characters used to reference items for sale, among other things. The efficiency of such algorithms may be based upon a number of factors including the speed and accuracy of the results.

BRIEF DESCRIPTION OF THE DRAWINGS

Some embodiments are illustrated by way of example and not limitation in the figures of the accompanying drawings in which.

DETAILED DESCRIPTION

Figure 1:
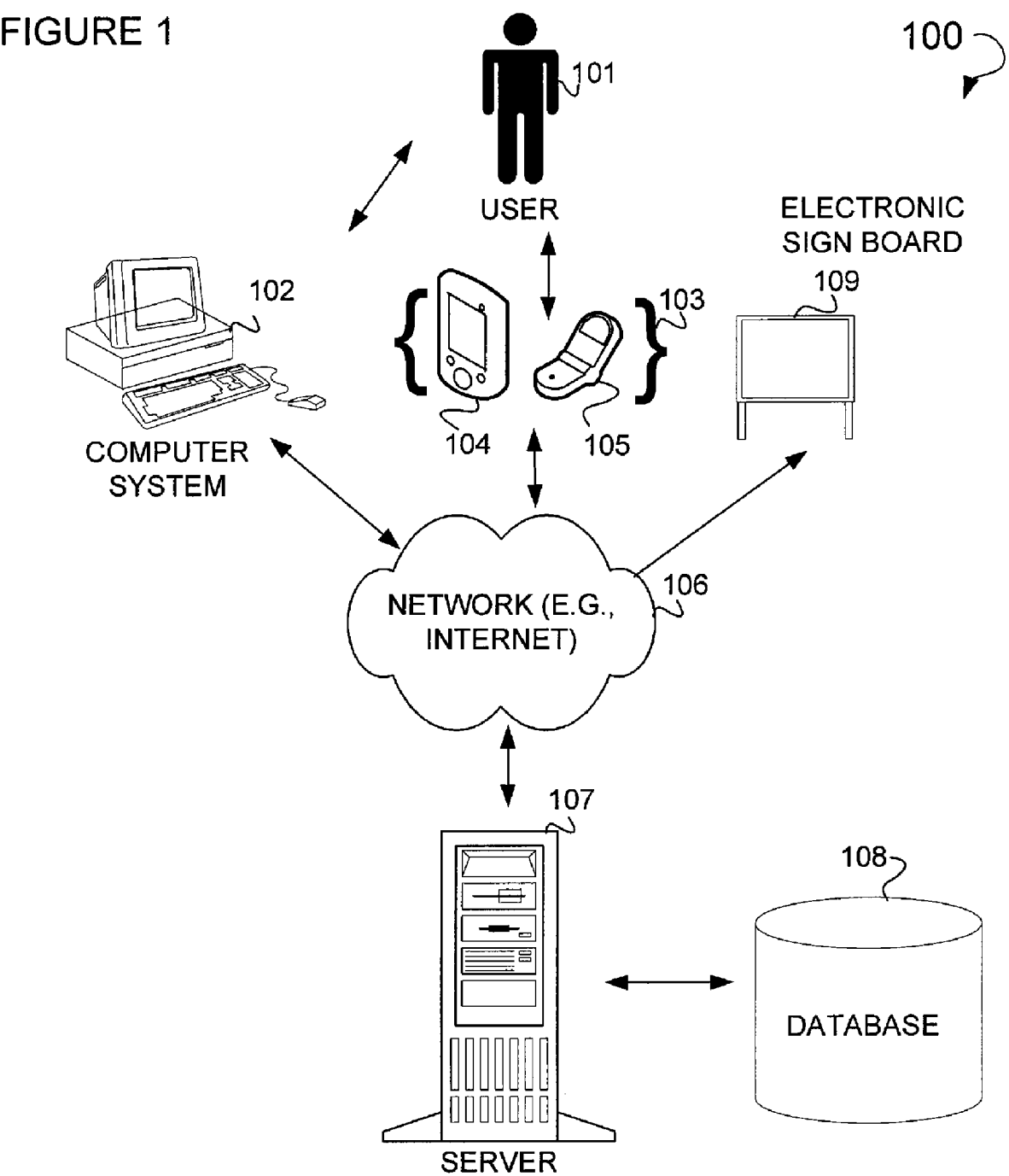
FIG. 1 is a block diagram of an example system for determining relevancy and desirability of terms.

In the following description, for purposes of explanation, numerous specific details are set forth in order to provide a thorough understanding of example embodiments. It may be evident, however, to one skilled in the art that the present invention may be practiced without these specific details.

Some example embodiments may include a system and method to facilitate textual summarization in real-time for an on-line end user (e.g., a person performing searches). This textual summarization may be based upon certain values such as supply, demand, and desirability. The use of these values to facilitate an adaptive method and system of real-time searching will be more fully described below.

In certain cases, there are limitations associated with searches of databases using strictly Boolean rules. For example, in the e-commerce context the use of strictly Boolean based search methods do not always return search results that reflect the particular searcher's intent. For example, an item A and an item B being available to sell is NOT always equivalent to both A and B being available to sell. Put another way, laptop battery is NOT equivalent to laptop AND battery, and laptop w/battery IS equivalent to laptop AND battery, while laptop w/o battery IS NOT equivalent to laptop AND battery. The notion of particular searcher's intent is tied up, in some cases, with desirability. For example, a user/searcher may want to only purchase an iPod nano, and not an iPod nano with a carrying case or some other extraneous items.

In some embodiments, demand, supply, and desirability associated with a search query (e.g., iPod nano) may be provided by numerical values, which are then, in turn, used to compute a relevancy score. This relevancy score is then used to organize (e.g., sort) results of a search query.

In some example embodiments, the relevancy score for a word within the body of text used, for example, to describe an item for sale on a web site, may be computed based on the historical statistics. For example, if a user searches for a keyword and clicks on a search result instance (e.g., an item in the search result), a relevance "credit" may be added to each word in the title (or other content portion) of the selected search result (e.g., the "clicked" item). If the user performs a further action with respect to the selected search result (e.g., bids on the item), a relevance algorithm, described below, may further increase the relevance score (e.g., by adding relevance credits) of grammatically meaningful portions of the body of text (e.g., to each word in the title of that item).

By contrast, for search result data with respect to which the user takes no further action (e.g., the user does not click through a particular search result, or does not take any commercial action with respect to an item listing), the relevance algorithm may reduce the relevance score for grammatically meaningful portions of the body of text (e.g., the relevance scores for each word in the title of an item listing may be reduced). In some embodiments, no change occurs to the relevancy score for a particular word. Further, when the relevance algorithm observes that the same query is received multiple times from multiple users, the relevance algorithm may compute statistics for that query.

Example System and Method Overview

FIG. 1 is a block diagram for an example system 100 where an end user 101 uses a variety of devices during the course of determining the relevancy and desirability of terms. These devices may be operatively coupled in a variety of configurations or topologies as are known in the art, for example, a computer system 102 may be operatively coupled via a network 106 to a server 107 which, in turn, is operatively coupled to the database 108. In lieu of, or in addition to, the computer system 102, a PDA 104 or a cell phone 105, both of which are collectively referenced herein as 103, may be operatively coupled to the network 106 and also to the server 107 which, as stated earlier, is operatively coupled to the database 108. In some cases, the computer system 102 or devices 103 may be used to display data on an electronic sign board 109 that is operatively coupled to the network 106. The various interfaces, software modules, associated operations, and other types of modules that are used to determine relevancy and desirability of terms are described below.

This system 100 may include a one or more servers 107 upon which reside a receiver, such as a network adaptor card (not pictured), to provide a network interface to receive search queries transmitted by a user 101. Further, this receiver may be a GUI in the form of a web page served up by the one or more servers 107 using network adaptor card, and associated network interface, wherein a user 101 inputs a search query using the GUI. (see e.g., module 201 below) Once this search query is received by the receiver, a first associator residing on the once or more servers 107 associates a keyword with a first numeric value (e.g., a percentage value reflecting number of times the keyword has been query relative to all keywords in the system). In some embodiments, this first numeric value may be based upon usage of the first keyword in a plurality of search queries. This first associator may be, for example, a logical "and" operation implemented in hardware (e.g., an "and" logic circuit), or a join operation implemented in software using a Structured Query Language (SQL). (see e.g., module 202 below) In some embodiments, this first numerical value represents a percentage of times the first keyword is referenced in a plurality of search queries. Once the keyword and the first numeric value are associated, a tracker residing on the one or more servers 107 is implemented to track user activity (e.g., click throughs, purchases etc.) associated with a keyword. This tracker may be, for example, a series of logical "and" operations (e.g., an "and" logic circuit) used in conjunction with a various registers implemented in hardware, or a series of join operations implemented using SQL. (see e.g., module 207 below) Some embodiments may include the tracker tracking user activity based upon some predefined (e.g., system administrator defined) activity by a user over a period of time, after a certain number of activity events (e.g., activity such as click throughs, bids, purchases, or added to watch list operations) or some other suitable metric for determining the initiation and duration of tracking. Further, a second associator residing on the one or more servers 107 is implemented to associate a second numerical value with the keyword based upon the user activity. In some embodiments, this second numerical value is based upon determinable user activity associated with the first keyword. Some embodiments may include the second numerical value representing the percentage of times user activity is associated with the first keyword relative to a plurality of user activities. As with the first associator, this second associator may, for example, be implemented using an "and" logic circuit, or SQL operations (e.g., a join operation) to associate a keyword with a second numerical value based upon user activity. (see e.g., operation 1105 below) This association between keywords and user activity is then, in some cases, used by a calculator residing on the one or more servers 107 to find a difference value between the first and second numerical values. This calculator may be implemented in hardware using a series adder-subtracter, or other suitable logic circuits implemented in hardware. Further, this calculator may be implemented in software using various subtraction functions. In some embodiments, the calculator is implanted in hardware or software as an algorithm by a module (see e.g., operation 1202 below) to find the difference value. Once this difference value, this difference value or set of difference values is calculated (see e.g., module 209 below), then a sorter residing on the one or more servers 107 is implemented to sort the keywords based upon the difference values. (see e.g., module 205 below) This sorter may be implemented in hardware or software. After the sorter has been executed, an outputer residing on the one ore more servers 107 akin to the network interface and associated adaptor card (not pictured) outputs the results of the sort. (see e.g., module 206 below)

Additionally, the system 100 may further comprise the one or more servers 107 with a second receiver (see above description of receiver) residing on the one or more servers 107 to receive a search query, an extractor residing on the one or more servers 107 to extract keywords from the search query, an adder residing on the one or more servers 107 to add the keywords to existing keywords, a re-calculator residing on the one or more servers 107 to re-calculate a percentage value for each keyword, and a storage operatively coupled the one or more servers 107 to store the re-calculated percentage value into a keyword database. (see e.g., module 202 below) In addition, the re-calculator may re-calculate the percentage value based upon each keyword and a probability of appearance in a search query result by the keyword. Some embodiments may include the percentage value representing a percentage of search queries that each of the existing keywords has been used in a plurality of searches. This receiver, extractor, adder, re-calculator, and storage may be implemented using hardware or, in some cases software using.

Moreover, the system 100 may further comprise a second receiver residing on the one or more servers 107 to receive activity data, an extractor residing on the one or more servers 107 to extract a keyword from the activity data to create an activity data set, a calculator residing on the one or more servers 107 to calculate a percentage the keyword is used in the activity data set, an averager residing on the one or more servers 107 to computer a new average based upon averaging in the percentage to an existing user activity percentage stored in a demand database, and a storage operatively coupled to the one or more servers 107 to store the new average value into a keyword database. (see e.g., module 207 below) Some embodiments may include an activity percentage that reflects user activity relating to the second keyword relative to activity relating to a plurality of keywords. The system 100 may further define user activity as selected from the group consisting of clicks, user bids, purchases, and added to watch list activities. The system 100 may further comprise an updator residing on the one or more servers 107 to update a database with the difference value. This second receiver, extractor, calculator, averager, and storage may be implemented using hardware or, in some cases software using.

Moreover, the system 100 further comprising a second receiver residing on the one or more servers 107 to receive a sort request of search results, a fetcher residing on the one or more servers 107 to fetch a list of keywords associated with the search results from a database, and an adder residing on the one or more servers 107 to add up desirability values associated with each keyword. (see e.g., module 205 below) Furthermore, the system 100 may describe the first numerical value as a demand value, the second numerical value as a supply value, and the difference value as a desirability value. This second receiver, fetcher, and adder may be implemented using hardware or, in some cases software using.

In some example embodiments, an end user 101, using a cell phone 105, can conduct a search query of a web site wherein the summarized-text search results are provided. In one example embodiment, the search query by an end user 101 constitutes contextual information used to evaluate certain keywords. However, in other embodiments, other contextual information may be used (e.g., contextual information regarding search queries from other users, contextual information regarding information trends (e.g., popular content) observed by a search engine, contextual information regarding item or service supply and demand with respect to a marketplace, etc).

In some embodiments, a cell phone 105 may be used to conduct search queries and may also be used to receive summarized text results. This cell phone may use the WINDOWS™, SYMBIANT™, LINUX™, PALM OS™ or some other suitable operating system. As may be more fully illustrated below, a user interface may be provided such that a user can conduct search queries. This user interface may be a GUI whereas, in other embodiments, it may be a command line interface. As previously stated, this cell phone 105 may be operatively coupled to a server 107 via a network 106. This network 106 may be a Code Divisional Multiple Access Network (CDMA) or other suitable type network.

Figure 2:
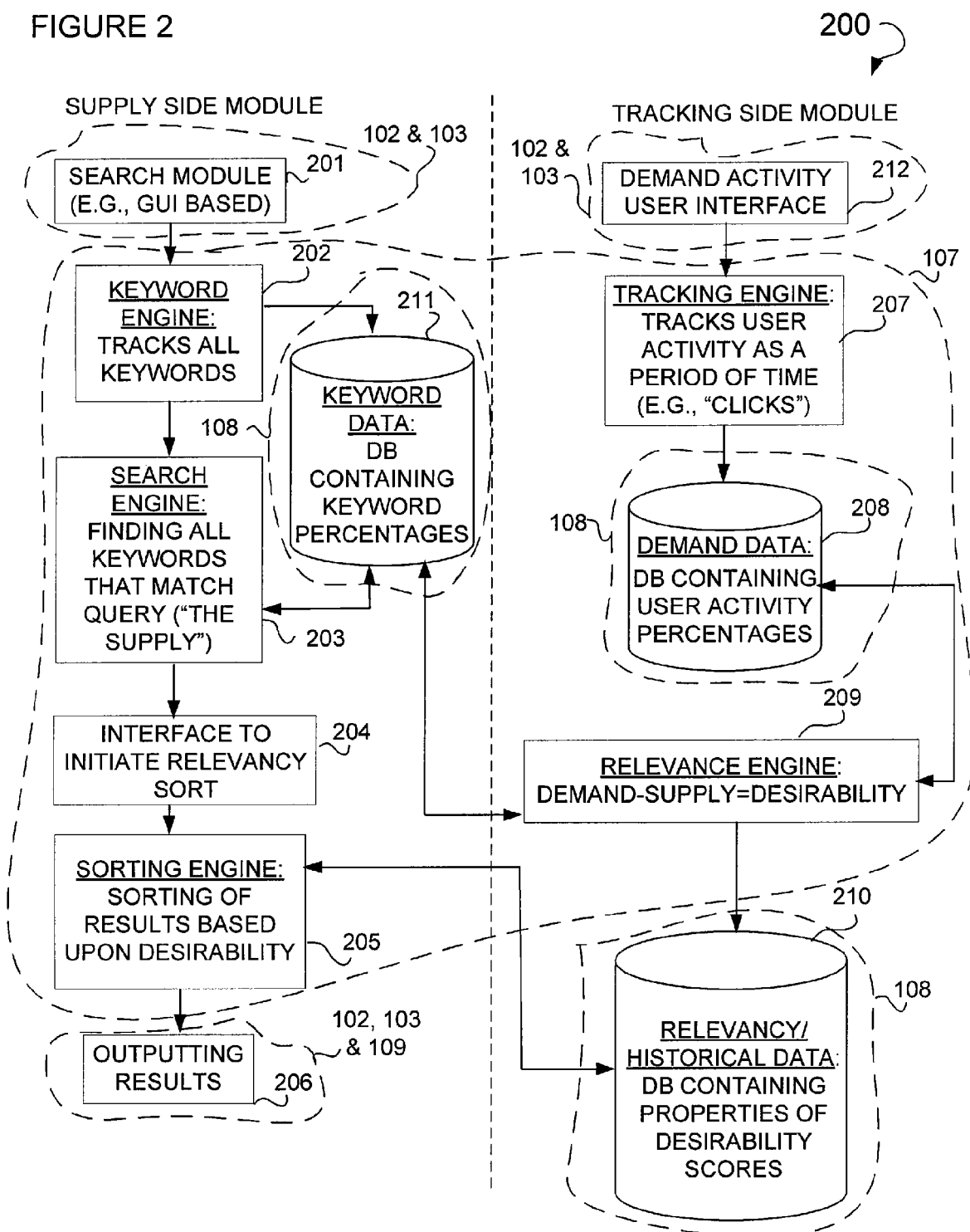
FIG. 2 is a dual stream flow chart illustrating an example method, and associated modules for determining the relevancy and desirability of terms with a first stream titled "Supply Side Module" and a second side titled "Tracking Side Module".

FIG. 2 is a method 200 illustrated using a dual stream flow chart. A first stream titled "supply side module" illustrates the supplying of various keywords, whereas a second stream titled "tracking side modules" illustrates the tracking of various demand activities. Starting with the supply side module stream, a search module 201 that resides on, for example, a computer system 102 or devices 103 receives search queries via, for example, a GUI. These search queries may then be provided to a keyword engine module 202 that resides on a server 107. This keyword engine module 202 tracks all keywords and stores them in a keyword database 211 that resides on the database 108. In some embodiments, database 211 resides on a database distinct form database 108. In particular, this keyword database may contain keyword percentages that are provided to a search engine 203 that, in effect, provides numerical values to be used later for a determination of a desirability value. This search engine 203 resides on the server 107. The results that search engine 203 retrieves are passed to an interface module 204 that allows an end user 101 to weight the various search results using various mathematical equations for weighting. This interface module 204 and its weighting of data is, in turn, provided to a sorting engine 205 that resides on the server 107. This sorting engine 205 sorts based upon a desirability score or various desirability scores obtained from a relevancy historical data database 210 to which it is operatively coupled. This relevancy historical data database 210 may reside on the database 108 previously described. In some embodiments, the database 210 resides on a database distinct from database 208. Once the sorting engine 205 sorts items based upon the desirability score, results are output via a output module 206. This output module 206 may reside on a computer system 102, various devices 103 or the electronic sign board 109.

The second stream of this dual stream flow chart titled "tracking side module" contains a number of activities relating to user activity tracking. A demand activity user interface 212, which resides on a computer system 102 or devices 103, provides user activity data via, for example, a GUI to a tracking engine 207 that tracks various user activities including, for example, the number of click-throughs a user may have executed. This tracking engine 207 resides on a server 107 and provides the results of this tracking to a demand data database 208, these results being in the form of user activity percentages. This demand data database 208 resides on a database 108. In some embodiments, the database 208 resides on a database distinct from database 108. A relevancy engine 209 finds the number of differences between demand, as stored in the demand data database 208, and supply as stored in the keyword data database 211. This difference is determined using a mathematical equation that is described below. Once the desirability value, for example a difference between demand and supply, is determined, the desirability value is provided to the relevancy historical data database 210. The relevancy engine 209 resides on the server 107.

A method 200 may include receiving a search query (see e.g., module 201), associating a first numerical value with a keyword that may be a part of the search query (see e.g., module 202), tracking user activity associated with the keyword (see e.g., module 207), associating a second numerical value with the keyword based upon the user activity (see e.g. operation 1005 below), finding a difference value between the first and second numerical values (see e.g., operation 1202 below), and associating this difference value with the keyword (see e.g., module 209), sorting keywords based upon the difference values (see e.g., 205), and outputting the results of the sorting (see e.g., module 206). Some embodiments may include the first numeric value being based upon the usage of the first keyword in a plurality of search queries. Moreover, in some embodiments, the second numeric value may be based upon a determination of user activity associated with the first keyword. Further, the first numeric value may represent the percentage of times the first keyword is referenced in a plurality of search queries. Additionally, the second numeric value may represent the percentage of times user activity is associated with the first keyword relative to a plurality of user activities. Some embodiments may include tracking user activity based upon some predefined (e.g., system administrator defined) activity by a user over a period of time, after a certain number of activity events (e.g., activity such as click throughs, bids, purchases, or added to watch list operations) or some other suitable metric for determining the initiation and duration of tracking.

Furthermore, the method 200 may further include extracting keywords from the search query, adding the keywords to existing keywords, re-calculating a percentage value for each keyword, and storing the re-calculated percentage values into a keyword database. (see e.g., module 202) Additionally, the method 200 may include recalculating the percentage value based upon each keyword and a probability of appearance in a search query result by the keyword. Example embodiments may include re-calculating a percentage value relating to each keyword, the percentage value representing a percentage of search queries that each of the existing keywords has been used in a plurality of searches.

Further, the method 200 may include receiving activity data, extracting a keyword from the activity data to create an activity data set, calculating a percentage the keyword may be used in the activity data set, averaging in the percentage to an existing user activity percentage stored in a demand database to generate a new average value, and storing the new average value into a keyword database. (see e.g., module 207) Some embodiments may include an activity percentage that reflects user activity relating to the second keyword relative to activity relating to a plurality of keywords. In addition, user activity may be selected from the group consisting of clicks, user bids, purchases, and added to watch list activities. The method 200 may further comprise updating a database with the difference value. The method 200 may further comprise receiving a sort request of search results, fetching a list of keywords associated with the search results from a database, and adding up difference values associated with each keyword. (see e.g., module 205) Further, the first numerical value may be a demand value, the second numerical value may be a supply value, and the difference value may be a desirability value.

In some embodiments, a computer-readable medium embodying instructions is implemented wherein instructions are described including a first instruction set to receive a search query (see e.g., module 201), a second instruction set to associate a first numerical value with a keyword that is a part of the search query (see e.g., module 202), a third instruction set to track user activity associated with the keyword (see e.g., module 207), a fourth instruction set to associate a second numerical value with the keyword based upon the user activity (see e.g., operation 1005), a fifth instruction set to find a difference value between the first and second numerical values (see e.g., operation 1202 below), and associating this difference value with the keyword (see e.g., module 209), a sixth instruction set to sort keywords based upon the difference values (see e.g., module 205), and a seventh instruction set to output the results of the sorting. (see e.g., module 206) In some embodiments, the first numerical value is based upon determinable usage, by a user, of a keyword in a plurality of search queries. Example embodiments may include a second numerical value based upon determinable user activity associated with the keyword.

Example Interfaces

The end user 101 may use a computer system 102 to conduct search queries. For example, the computer system 102 may use a Hyper Text Transfer Protocol (HTTP) to make search queries and to receive web pages containing relevant or full-text search results. This computer system 102 may provide a GUI to allow the end user 101 to enter search queries. The results of these search queries may be presented on the computer system 102, and more to the point, on a screen operatively coupled to the computer system 102. These search results, however, may be projected or presented onto some type of other display medium including, for example, an electronic sign board or message board. The search results may be understood as providing a text summarization, wherein the search results are summarized based upon the most relevant (e.g., desirable) keywords as determined by, for example, an algorithm executed at operation 1202 described below. The following GUIs (e.g., 301, 501, and 701) reflect the results of the execution of this algorithm.

Figure 3:
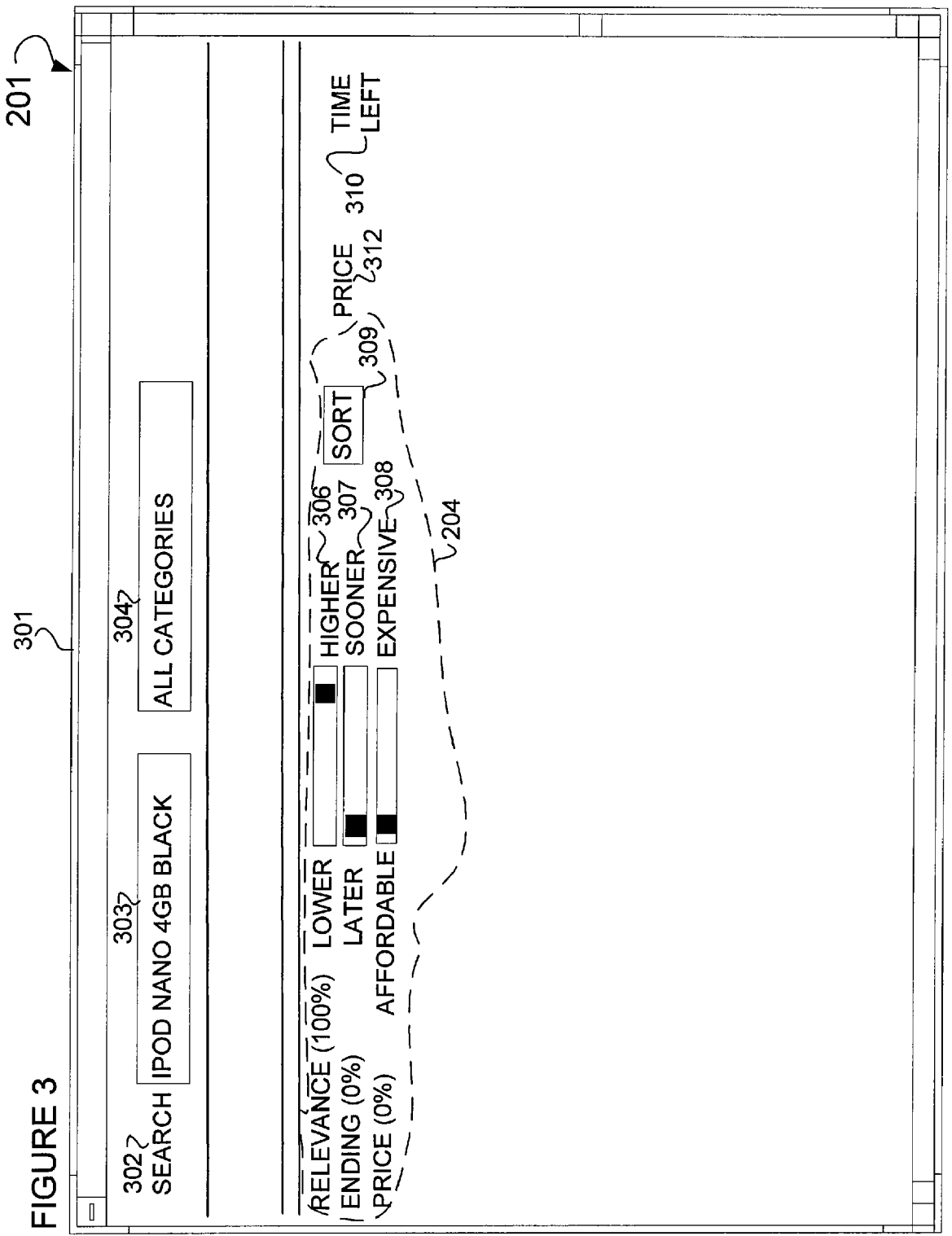
FIG. 3 is an example Graphical User Interface (GUI) diagram illustrating execution of a search module, according to an example embodiment.

FIG. 3 is a user interface diagram illustrating a GUI 301, according to an example embodiment, that reflects the output of the execution of, for example, the search module 201. Illustrated is a search field 302 containing a text box 303 which, in turn, has search data in the form of "ipod nano 4 GB black" entered into it. Also illustrated is a text box 304 that may be a drop-down menu or other type of screen object or widget. Additionally illustrated here is the execution of an interface module 204, illustrating various ways in which relevancy values may be sorted. For example, a screen widget 306 describing relevancy is set to 100% described herein as 306. A second screen widget 307 describing the ending price is set to 0, described herein as 307. A price object or widget 308 is also set to 0. Objects 306, 307, and 308 may be thought of as weighting input objects. These weighting input objects allow for a user to weight various categories used to determine demand. For example, a user may choose to weight the demand value of relevance more than the demand value of auction ending time, or a weight based upon the price of a particular good or service. As illustrated in object 306, the relevancy value or weight may be set to 100. This would mean that the search as entered in the text box 303 would seek to find matches based primarily on the values entered into the text box 303 that is "ipod nano 4 GB black." Here, in this example, the auction ending time weight is set to 0%, as is the price. Or, more specifically, the latest ending period is requested, as is the most affordable price. In some embodiments, some type of scale object adjustable via an input device, such as a mouse, is used to set the weight, whereas, in other embodiments, some other type of screen object or widget is used.

Also described is a sort button 309 executed when a new weight value is set by an end user 101. This weight value may be set automatically via a call to a function that receives a percentage value and returns the corresponding search result. That is, for example, if one sets a new relevancy weight value, an auction ending time value, or price value, then a user may execute the sort button 309 to re-sort the search results. Additionally illustrated is sort button 309 that when executed, implements the sorting engine 205. Further illustrated is a time left field 310 describing how much time is left in an auction, and a price field 312 illustrating the price for a particular search result.

Figure 4:
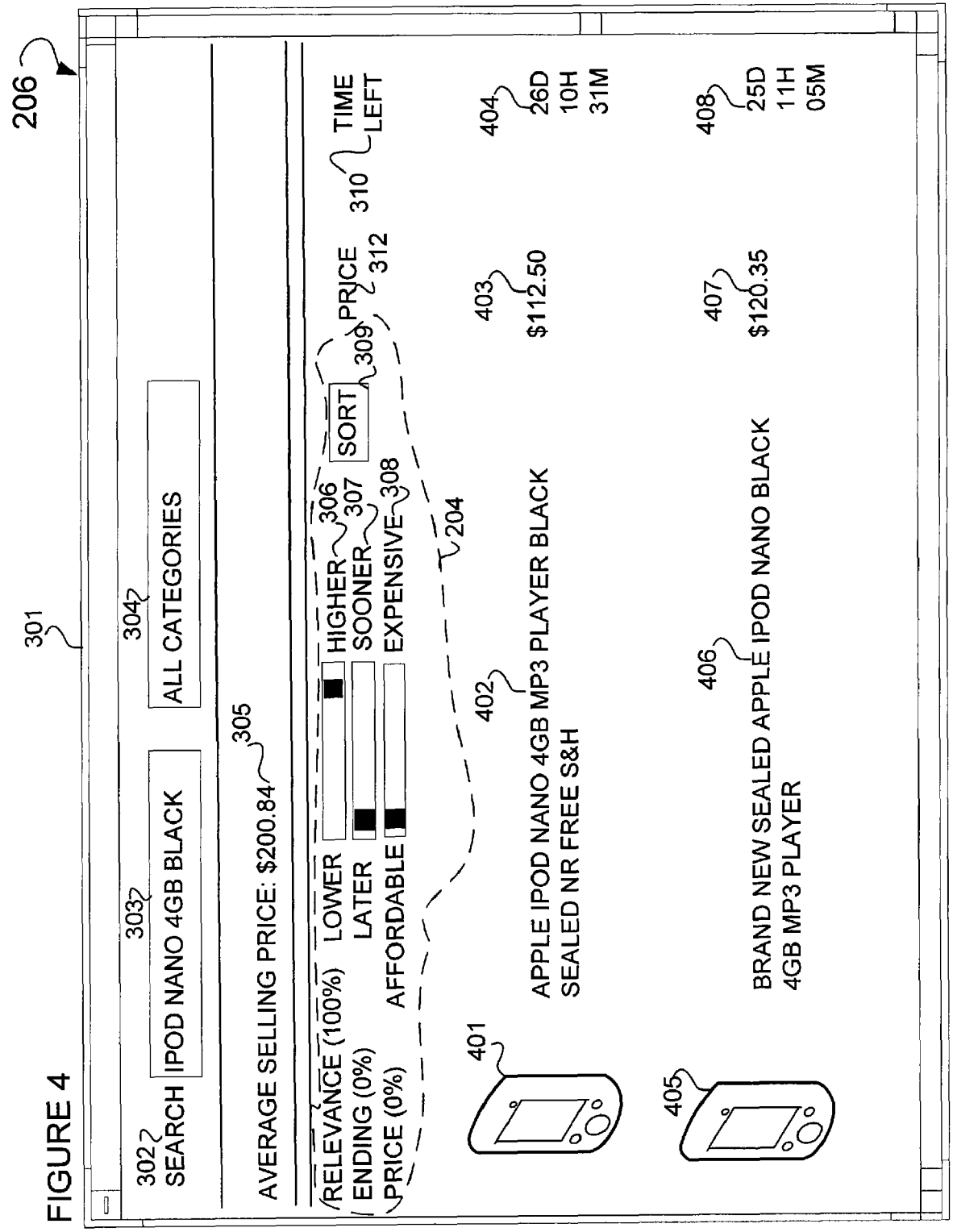
FIG. 4 is a GUI diagram showing a user interface, according to an example embodiment, including results from the execution of an output module.

FIG. 4 is a user interface diagram illustrating an example GUI 301 that results from the execution of an output module 206. A search result 401 in the form of an "Apple ipod nano 4 GB MP3 player black sealed NR free S & H" is illustrated. Associated with this description are a price field 312 and the time left field 310. Based upon the setting of the object 308, the price value illustrated would be the most affordable search result, which here is $112.50. Also based upon the setting of object 308, a time left value 404 is illustrated, which in this case is 26 days, 10 hours, and 31 minutes. Put another way, the search result 401 describes (see e.g., description field 402) the most affordable (see e.g., the price field 403) "ipod nano 4 GB black" that has the latest auction ending time and is the most relevant to the search query. Also illustrated is a search result 405 containing the description 406, which is "brand new sealed Apple ipod nano black 4 GB MP3 player." This search result 405 has a price 407 of $120.35 and a time left value of 408 of 25 days, 11 hours, and 5 minutes.

Figure 5:
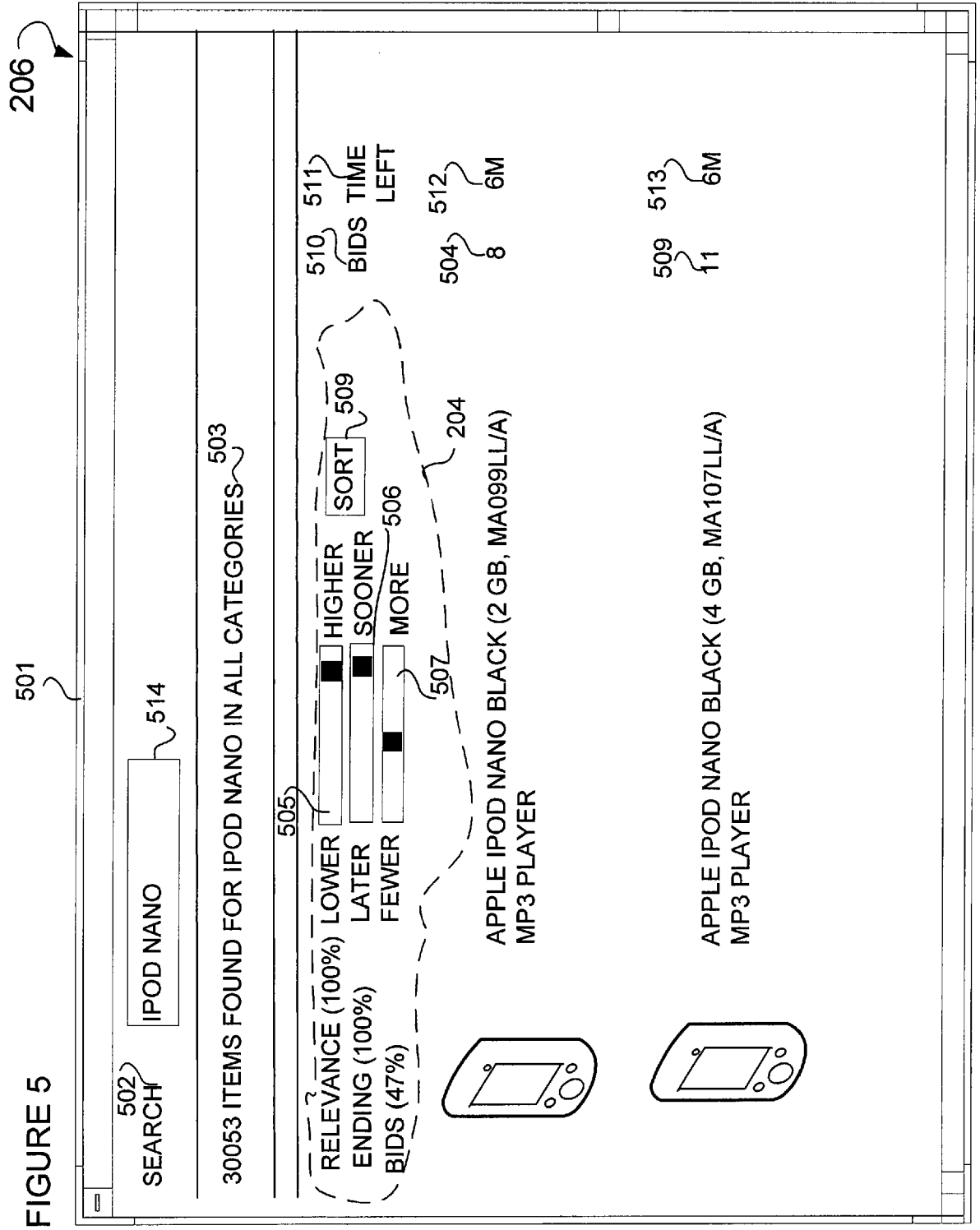
FIG. 5 is an example user interface that results from the execution of a search module, according to an example embodiment.

FIG. 5 is an example GUI 501 that results from the execution of a search module 201 and the display of these results via executing an output module 206. In some embodiments, a browser interface 501 is illustrated. This browser interface 501 may include a search field 502 that contains a text box 514. Some example embodiments include a search result summary field 503 summarizing the total number of items that have been found based upon the query entered, which in this case is "ipod nano." Also illustrated are various score weighting input objects or widgets. Here, for example, there is an input object or widget 505, 506, and 507. These objects or widgets correspond to a relevancy setting, auction ending setting, time setting, and a bid setting. For example, a bid value set to a weight of 47% reflects the user's desire to have the list of returned items matching the query be weighted based upon, but not limited to, bids occurring within the 47th percentile of all bids relating to "ipod nano" as a search query. A bids field 510 contains various types of bids 504 and 509, such as, for example, 8 bids and 11 bids. Also described is a time left field 511 with an example time values 512 and 513 of six (6) minutes. Bids 504 correspond to an "Apple ipod nano black (2 GB, MA079LL/A) MP3 player," whereas bids 509 corresponds to an "Apple ipod nano black (4 GB, MA107LL/A) MP3 player." Also a sort button 509 is illustrated, which has functionality previously illustrated. In some embodiments, an auction ending value 506 is set to 100 to reflect that user's desire to have the soonest ending bids to be a weighted value within the search result for "ipod nano" as illustrated in text box 514.

Figure 6:
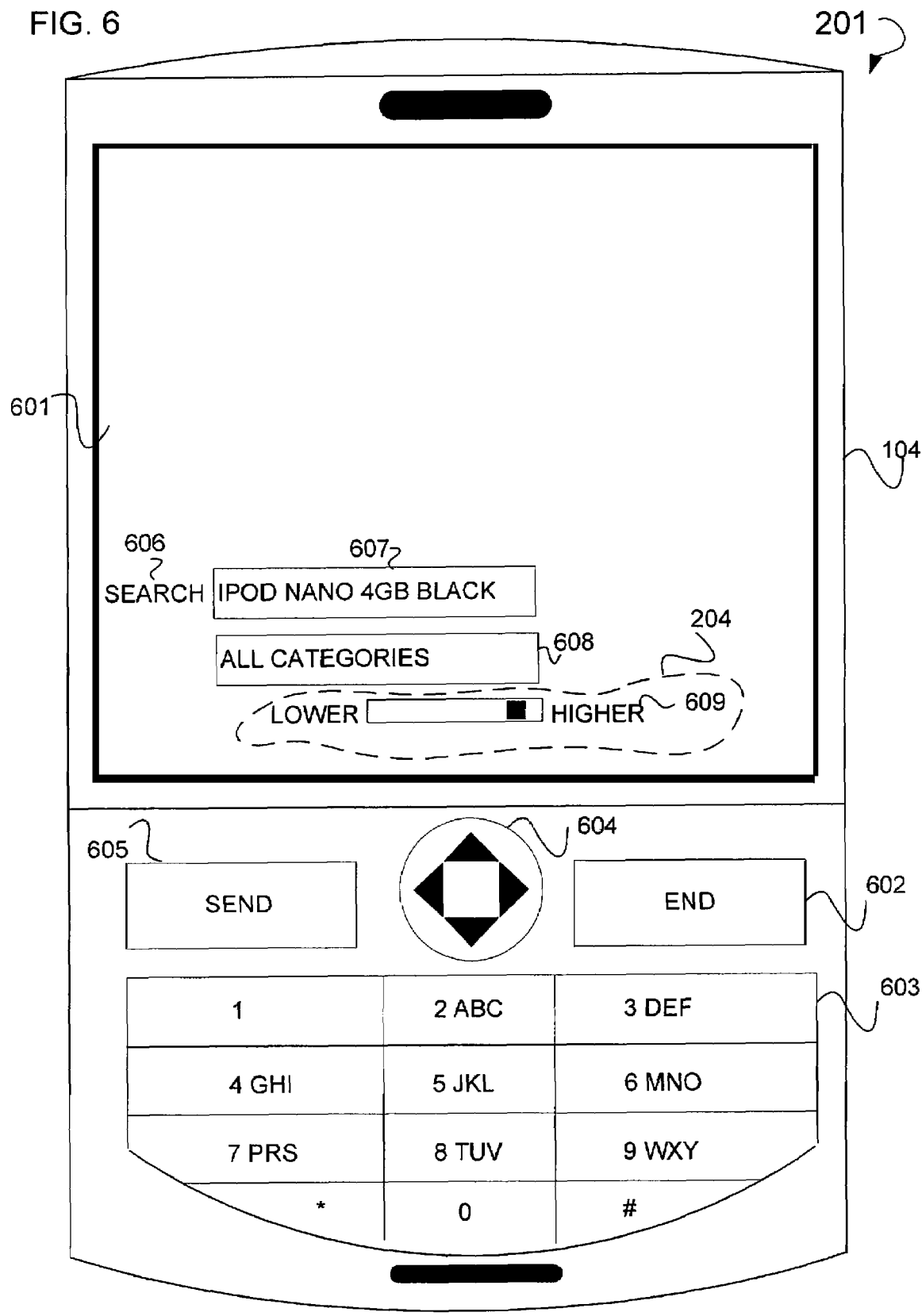
FIG. 6 is an illustration of an example Personal Digital Assistant (PDA) executing a search module and interface module, according to an example embodiment.

FIG. 6 is a block diagram showing an example PDA 104 executing a search module 201 and interface module 204. With regard to the search module 201, a screen 601 displays a search field 606 with a text box 607 used to conduct a search query. A drop-down menu or other suitable object 608 allows a user to select a category of goods. As to interface module 204, a weighting object 609 allows an end user 101 to set a weighting value. These weighting values, such as those depicted in 607, include relevancy such that a user, using a input device such as direction button 604, can increase or decrease, make lower or higher, a relevancy weight value. A user may conduct search queries for goods via the PDA 104 using, for example, a keypad 603 that contains alpha-numeric values. Once a search query is entered it can be sent using a button 605, or the whole process can be ended using a button 602. A screen can be navigated using the direction button 604. Additional input objects can be used to add weight values to, for example, such demand categories as clicks, titles, keyword descriptions, pictures available, seller ratings, price range, or other measures of desirability.

Figure 7:
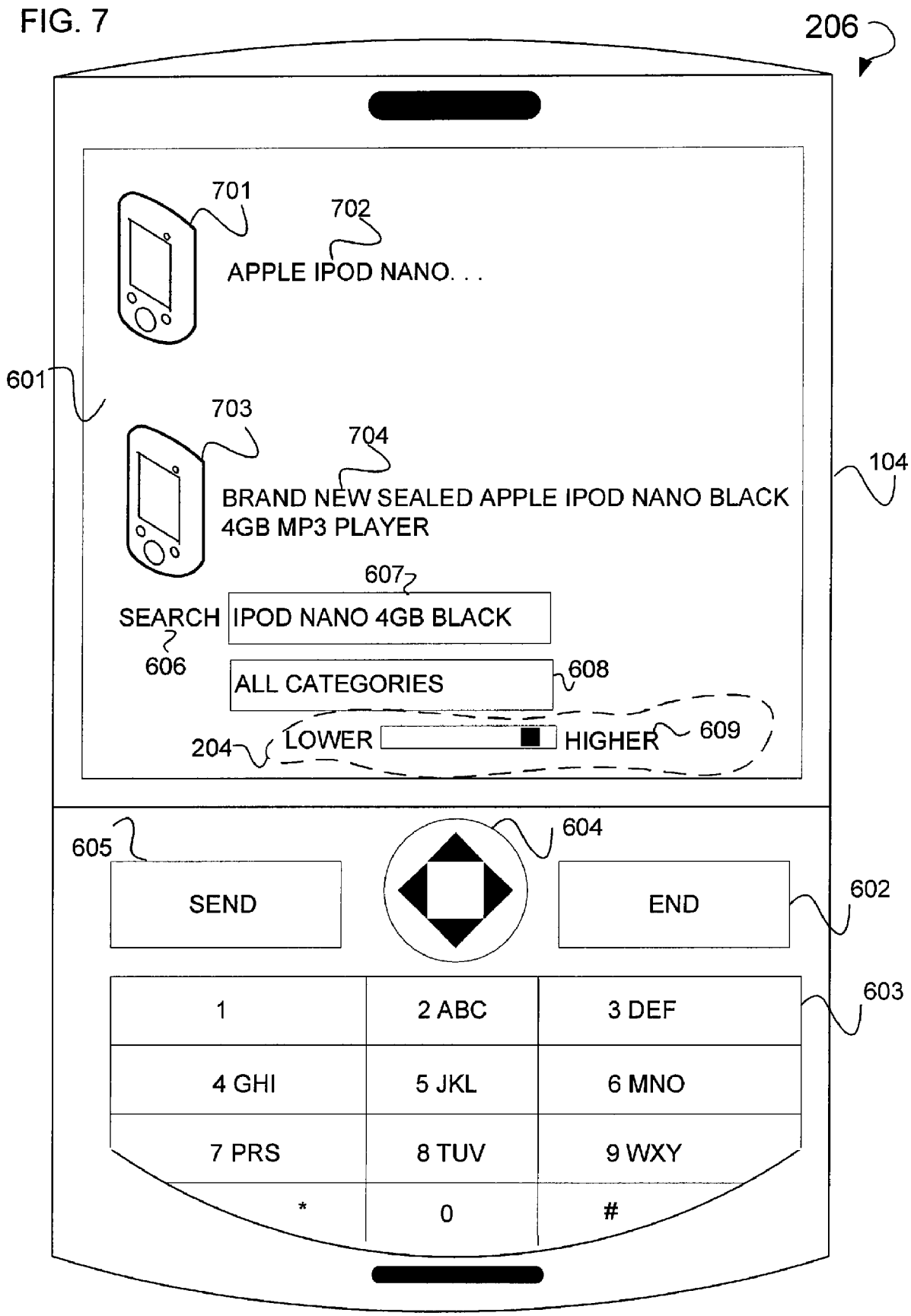
FIG. 7 is an illustration of an example PDA describing the results of the execution of an output module, according to an example embodiment.

FIG. 7 is a PDA 104 illustrating the results of the execution of an output module 206 illustrated as a search result 701 with a shortened description field 702 describing the result of the search as an "Apple ipod nano . . . ". The method used to obtain this shorted description field is described below. A second search result field 703 is also illustrated providing a search result described in field 704 as a "brand new sealed ipod nano black 4 GB MP3 player."

Figure 8:
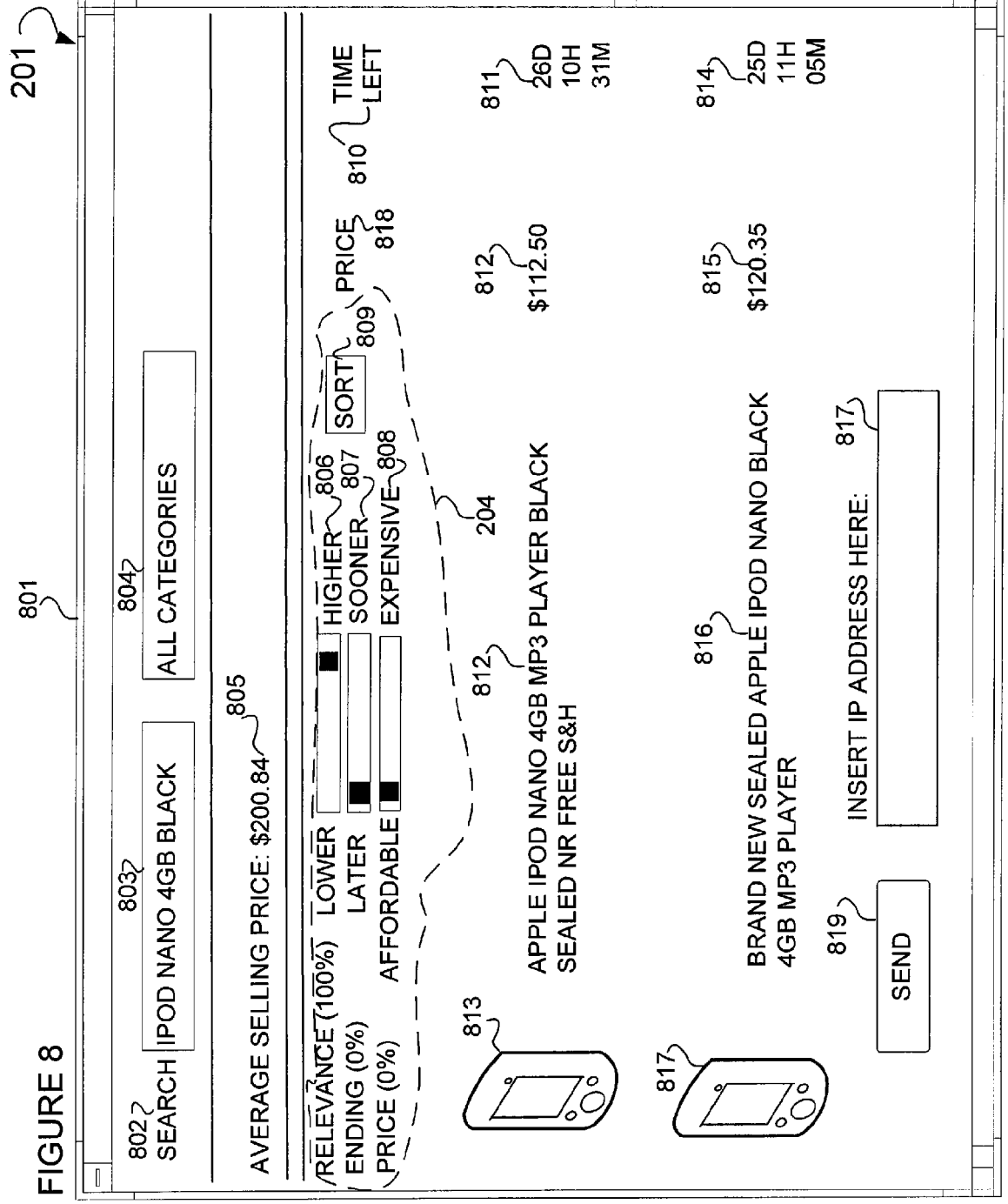
FIG. 8 is an illustration of an example user interface illustrating the results of the execution of a search module, according to an example embodiment.

FIG. 8 is a user interface diagram illustrating an example GUI 801 displaying the output of a search module 201. The GUI 801 includes a search field 802 containing a text box 803 with a search input or query titled "ipod nano 4 GB black." Also illustrated is a text box 804 which, in some cases, is a text box or in other cases a drop-down menu or other object or screen widget. Additionally illustrated is a field 805 describing the average selling price for the search query, which in this case is $200.84. Also illustrated is the interface (see module 204) to initiate a relevancy sort via an object 806 which is a relevancy setting object, an object 807 which is an auction ending object, and a price object 808. Additionally illustrated is a sort button 809.

Further illustrated in this GUI 801 is a time left field 810, a price field 818, and various search results, for example, a search result field 813 describing a search result in the form of a "Apple ipod nano 4 GB MP3 player black sealed NR3 and free S & H." Also, under the price field 818 is a price 812 of $112.50. Further described in this search result 813 is a time left and a time left field 810 is the time left value 811 in this auction, which in this case is 26 days, 10 hours, and 31 minutes. Additionally illustrated is a search result 817 described in the description field 816 as a brand new sealed "Apple ipod nano black 4 GB MP3 player." Further, under the price field 818 is a price 815 of $120.35. Moreover, under the time left field 810 is a time remaining in the auction 814 field containing the time left value 814, which in this case is 25 days, 11 hours, and 5 minutes. In addition, a send button 819 is illustrated, as is a text box 817, wherein one may enter an Internet Protocol (IP) address. The send button 816 and text box 817 act to allow one to send search results (e.g., 803 and 807) to, for example, an electronic sign board 109 wherein the electronic sign board 109 has an IP address associated with it such that it may receive textual or graphical data such as that provided by or described or illustrated in fields 813 and 817.

Figure 9:
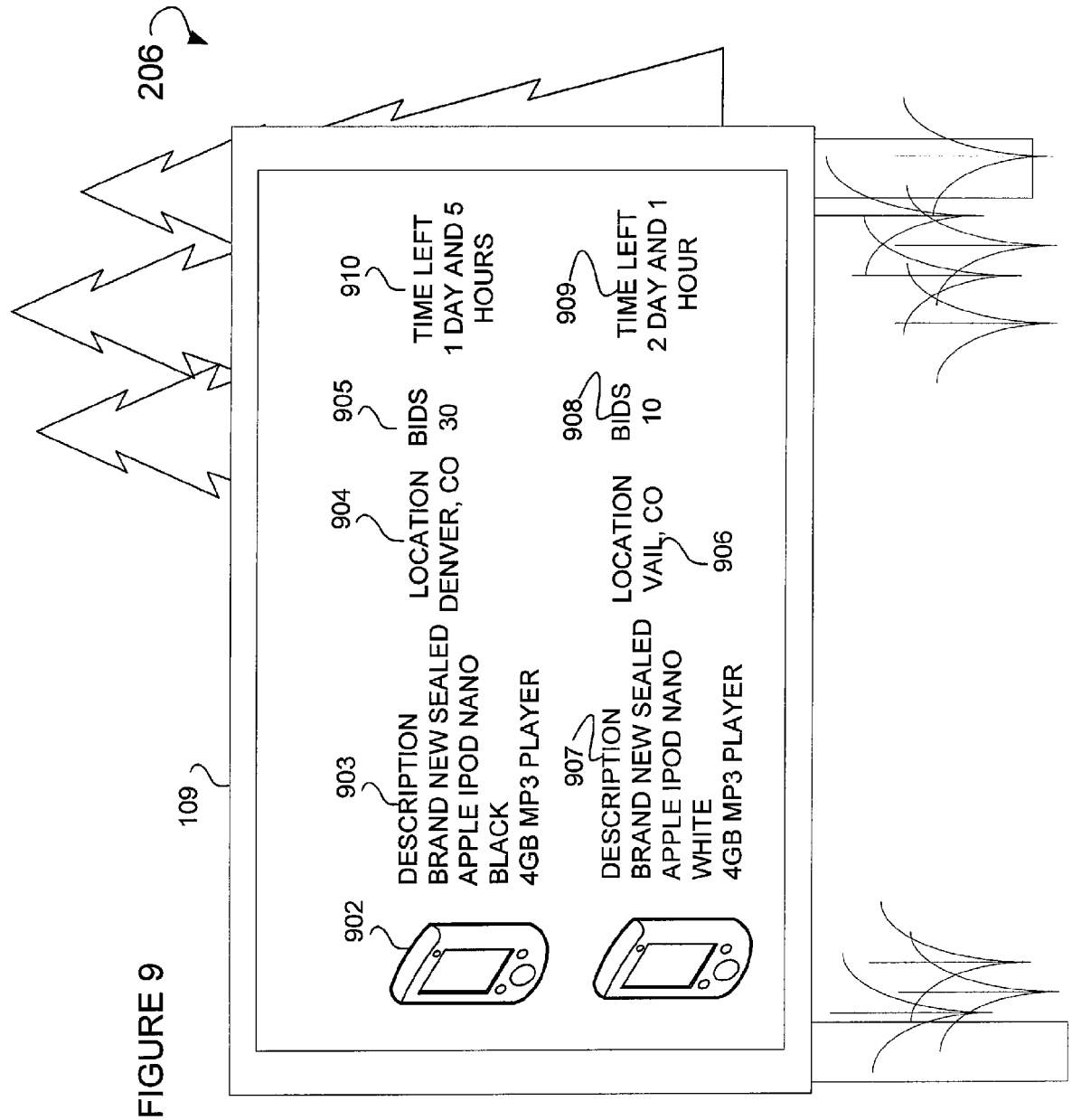
FIG. 9 is an example result of an output module in the form of search results displayed on an electronic sign board, according to an example embodiment.

FIG. 9 is an example result of an output module 206 in the form of search results displayed on an electronic sign board 109. This sign board is an electric sign board that can display messages of various types. A search result 902 illustrates, with a description 903, a "brand new sealed Apple ipod nano black 4 GB MP3 player." A field 904 describes the location of the seller of the item illustrated in field 903. A field 905 illustrates the number of bids (e.g., 30) on the item illustrated in field 903. In some example embodiments, the time left for an auction, which here is 1 day and 5 hours, is illustrated in field 910. This time left in auction field relates to the item illustrated in field 903. Field 904 shows "Denver, Colo." as the location. A second location field 906 states "Vail, Colorado" as the location. A description field 907 describes a "brand new sealed ipod nano white 4 GB MP3 player." A field 908 describes the number of bids, which is 10, whereas, a field 909 describes the time left in the auction, which is 2 days and 1 hour.

In some example embodiments, the physical location of the electronic sign board 109 may dictate that the desirability weight be weighted heavily in favor of obtaining search results with a seller location close to the physical location of the electronic sign board 109. Put another way, where the desirability weight uses physical location, the location of the seller and the electronic sign board 109 should be known, such that the search results with sellers in close geographical proximity can be retrieved and displayed. This geographical proximity may be determined using the IP address of the electronic sign board 109 compared to the physical address of the seller.

Some example embodiments may further include an automated search algorithm that automatically retrieves items with the highest desirability score for a geographical region. This algorithm could perform a simple SQL query for a location (e.g., "Denver") for items with the highest desirability score and then display these items.

Example Algorithms

In some embodiments, a user may be prompted with a web page containing a title and category of goods or service and may be automatically provided with recommendations regarding good keywords to be added, or bad keywords to be removed prior to conducting a search query. The concepts of good and bad, as may be more fully discussed below, may be based upon a numeric value associated with the keyword. For example, these recommendations may take the form of words that may be filled in automatically into the text box as the user is typing his or her query. In still other embodiments, the user may have a drop down menu that may be automatically populated with good keywords relating to a particular query, keywords that the user can select. Some other suitable method for automatically allowing a user to select keywords via a widget may be implemented.

In some embodiments, relevance search functionality may be implemented that may allow for: reducing the manual effort associated with conducting a search query, automated rule generation, real-time updating of the data set used to provide search results, extensible flexible—configurable as per business needs, reuse for multiple types of search functionality across any data set, and general purpose technology that can function as an enabling basis for a variety of uses at a publication system.

The desirability of a keyword contained in a search query may be viewed as the differential between demand and supply of the keyword and the goods associated with the keyword, taken within the context of the user's search query or other data. For example, the desirability of a keyword in a title of publication data is one visual factor that may cause a user to direct his or her attention and select that particular publication data in search results, even though it is buried within a large set of titles and words. Conversely, for example, when a keyword is present many times on a page, but is selected in a much smaller proportion when compared to other selections, that keyword may be highly undesirable. Accordingly, search results or data in the form of publication data can be sorted, for example, to mimic (e.g., create a "demand profile") the keywords contained within these search results.

In some embodiments, certain keywords in a search query are weighted or provided a numeric value. This numeric value is based upon the certain economic concepts such as supply, demand, and desirability quantified via the number of times a keyword exists as a part of a description of a good or service in a search result (e.g., supply), the number of times a particular keyword is a part of a search query or is selected (e.g., demand), and the difference between supply and demand (e.g., desirability). In some embodiments, for example, a desirability index is computed (e.g., in an offline mode) using the latest demand and supply (e.g., demand and supply for items offered for sale in an online multiple item listing) snapshot. In some embodiments, other factors may be used to compute a value. These factors include when a product of service corresponding to a search query became available on the market. For example, wherein the data is an auction listing for a good, a time component of weighted relevance score may be in the direction of ending "later," instead of ending "sooner" (see e.g., object 307). Publishers of an auction listing may be motivated to modify publication data immediately after listing. If the relevance sort were, for example, to show newly listed publication data by default, publishers may know if the publication data has a low or high score, and proceed to revise again and again until they get a good placement. If, for example, the ordering favors ending soon, a publisher may discover an auction listing approximate score near the end time, at which time publication data modifications may be restricted. These quantified values create a data set that can be used to order certain keywords, or combinations of keywords as they may appear in a search result. These search results may be ordered or sorted based upon these quantified keyword values, or combinations of keyword values. Other example embodiments may be extended to all publication data features or attributes, not just keywords. Such attributes may include, for example, numerical features like seller rating, geographical location, price range, # of bids, time left, Boolean features like bin/auction etc. This mapping of numeric values to keywords is more fully illustrated below.

In some embodiments, search results may be sorted such that the spectrum of the search results may be displayed in a manner that a user can easily review the spectrum of the search results. In some embodiments, since the initial web page gets the most reviews, an example embodiment seeks to represent the entire spectrum of the Demand profile in an initial presentation (e.g., on the first page) of search results. In another example, for users looking for DELL™ laptops, if 20% of users usually want LATITUDES™, and 15% INSPIRONS™, then an example embodiment may show approximately 20% DELL LATITUDE™ laptops, and 15% INSPIRONS™ in an initial presentation of search results. Going to a subsequent presentation (e.g. the next page), the display may also be similar to the demand profile.

In some embodiments, various measures of demand are taken. Demand may include the number of clicks on a GUI object or other type of input used to select a particular good or service. Demand may also be in the form of a title as searched for by a user, keywords as used to search by a user, or whether the item or query returned had a picture or has a picture. Demand may also be determined as searching by seller rating, or searching by time left in an auction, or searching for a good or service in a particular price range or geographical location. Moreover, the auction type of shipping prices may be an indicator of demand. These various measures of demand are stored in a database. Once stored they are given a value and then compared to supply with the difference between demand and supply yielding a result in the form of a desirability value or score. This desirability value or score is then saved into a database. In some example embodiments, a GUI is used to perform searches based upon the weighting of these various demand types or measures. For example, a user may, in some embodiments, be able to weight their search entirely based upon time left in an auction. So, for example, if one conducts a search for "iPod nano," they can weight their search so that they get that "iPod nano" with the most time left in the auction or the least amount of time left in the auction. Similarly, they may be able to perform a search that is weighted towards geographical location such as, for example, they may be able to search for "iPod nano" but based upon their present geographical location or location that they provide they may be able to weight a search such that they find the "iPod nano" that is geographically closest to them or geographically most distant. Still, in some other embodiments, a user may be able to weight demand based upon price range. Such as, for example, a user may be able to conduct a search for "iPod nano" but set the weighting such that they get that "iPod nano" with the lowest price, that is the most affordable "iPod nano," or that "iPod nano" with the most expensive price. Still, in other embodiments, these various weighting can be combined together such as, for example, geographical location, price range, and time left in an auction can be combined together such that you get a search query that most closely reflects all three of these weightings, plus the query. FIGS. 3 and 4 reflect this type of weighting combination.

The sorting of these search results based upon a demand profile or weighted value can be performed in real-time, or offline using efficient sorting algorithms such as Quick sort, Radix sort, or some other type of sorting algorithm providing, for example, O(nlogn) or O(n) performance. This demand profile and its associated values or the weighted values are used as, for example, the basis for sorting supply, demand, desirability, or some combination of these values.

In some embodiments, once these search results are sorted, they are placed into some type of efficient data structure so as to allow for efficient searching. These data structures include a Binary Search Tree, Radix Tree, Hash Table, Heap, Red-Black Tree, or some other suitable data structure as is known in the art. In some embodiments, an auto-tag hierarchy is extracted from the search results and stored in a data structure such as those described above.

In some embodiments, words may be encountered which have not been quantified, that is, words that do not as of yet have a numeric value associated with them. A numeric value may be attached to these words based upon the value of similar words as they presently exist in a data set or based upon an auto-tag structuring technology. For example, upon running the auto-tag structuring on publication data returned for a search query for a DELL™ laptop, if a new word is encountered in the binary search tree where all its peers are LATITUDE™ models, then the algorithm may make reasonable assumption that it is also a LATITUDE™ model. The information from other LATITUDE™ models may then be automatically used to bootstrap the relevance information for the new word, along with a positive bias to give it more exposure initially. In a short amount of time, enough data may, in the above manner, be collected to consider it a known word.

This algorithm may have one or more of the following characteristics: it may not be "dependent" upon classification engine for functionality, it may be complementary to classification engine when present, it may not require extensive manual work or defining rules, it may be highly configurable on a macro level, (e.g., weight profiles etc.), it may work on random text, not just well formed products, it may provide a framework for evaluating not just text, but multiple types of feature, including unbound or range bound numeric features, multi-valued name/value pairs, it may respond quickly and automatically to gaming, it may be able to provide a demand-proportional coverage snapshot of inventory, it may be able to evaluate relevance of an entity given a variety of contexts (e.g., how relevant is it to this input query, or how relevant is it to this user, or how relevant is it to this "group of socially connected users" and so on, in real time), and it may perform as best as possible for a long series of unpopular queries.

Again this algorithm may have one or more of the following additional characteristics: it may be always up-to-date, accurate, and current with market trends; it may allow for keyword experience/history of use (see the description for the feedback loop above) as a value to organize any data structure so as to guarantee minimum average number of clicks before a bid; it may allow for content summarization, research, and a title modification advisory service; it may function such that given a title and category, we can recommend good keywords to be added or bad keywords to be removed; it may facilitate mobile search functionality; it may allow for the intelligent auto-summarization of content; it may be applied to multiple types of publication data features, not just keywords, including, for example, numerical features like price, number of bids, time left, and Boolean features like bin/auction etc.; it may allow for average selling price determination to be used; it provides for an instant hot deal finder; and it may allow for a community based taxonomy generation assisted by automatic clustering.

Figure 10:
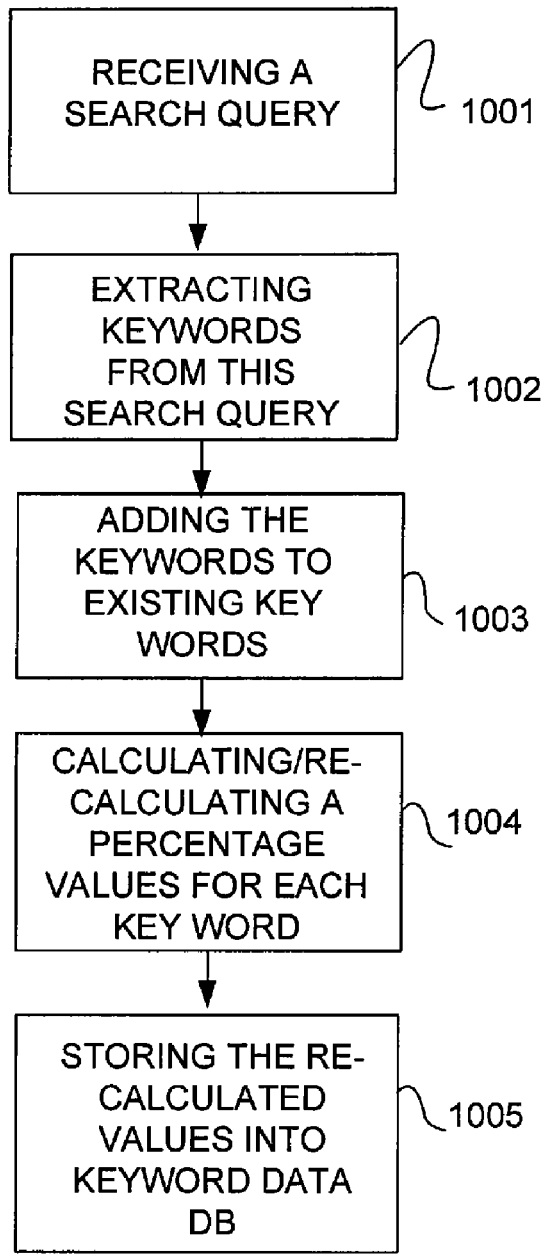
FIG. 10 is an example flow chart illustrating the various operations or processes that make up the keyword engine method, according to an example embodiment.

FIG. 10 is a flow chart illustrating a method 1000 to process keywords, has may be performed by the keyword engine 202, according to an example embodiment. At operation 1001, the key word search engine 202 receives a search query from, for example, a search module 201. Once the search queries are received, an operation 1002 extracts keywords from the search query. The extracted keywords are then added to existing keywords by the keyword engine 202 at operation 1003. Once these new keywords are added to the existing keywords, the keyword percentages for all keywords are calculated/recalculated by an operation 1004. Once recalculated, these new keyword percentage values are stored into the keyword data database 211 by operation 1005.

The percentage value for, for example, keywords denoting supply, as illustrated at operation 1004, is calculated in the following manner. The total occurrence of every unique keyword in all the titles is first determined. Then the percentage occurrence of each keyword in the result set is determined. For example, if there were 1000 items in the result, and the word "charger" occurs in 900 items, then the supply percent of charger is 90%. If the keyword "player" occurs in 50 items, then its supply percentage is 5%.

Figure 11:
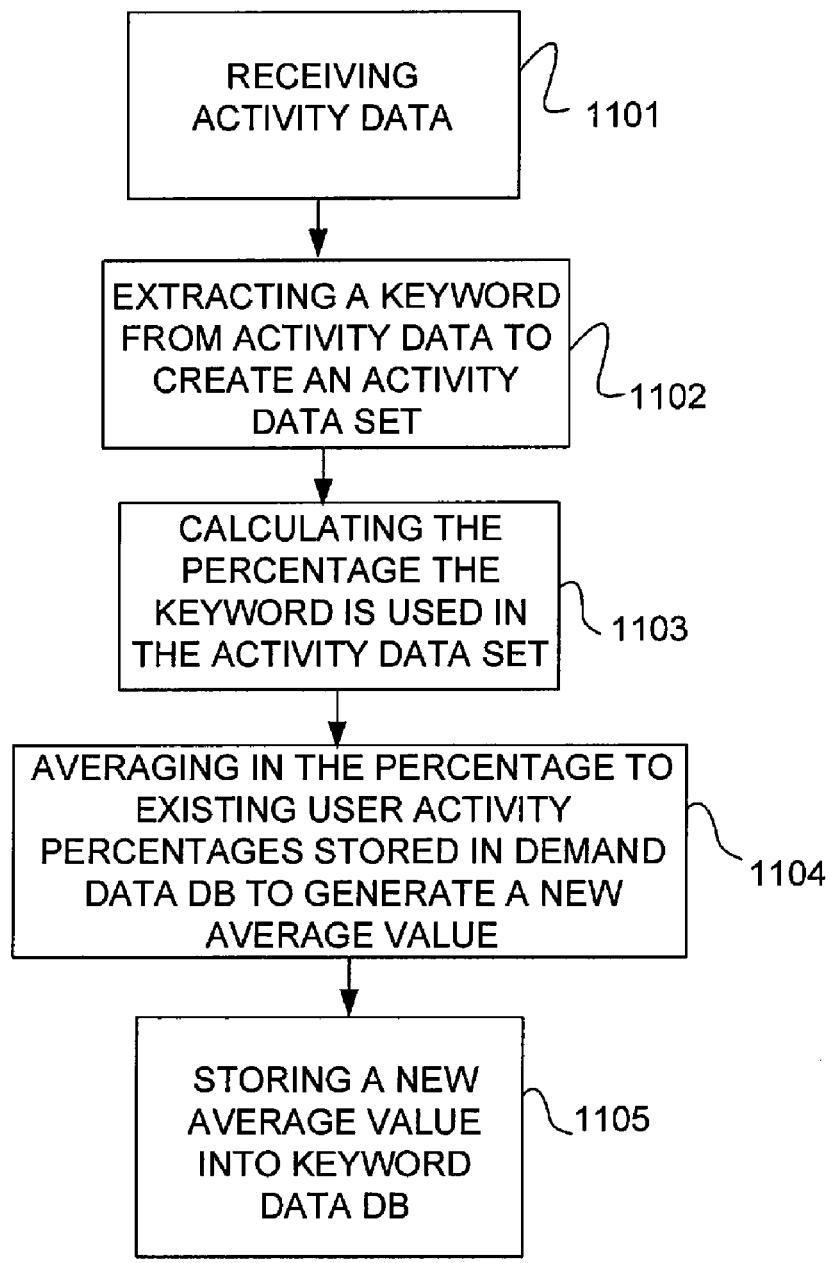
FIG. 11 is an example flow chart illustrating the various processes or operations associated with the tracking engine module, according to an example embodiment.

FIG. 11 is a flow chart illustrating the various operations associated with the tracking engine 207, according to an example embodiment. At operation 1101, demand activity data is received from a demand activities interface 212. Once this data is received, operation 1102 extracts keywords from the activity data to create an activity data set. Once the keywords are extracted, the percentage that each keyword is used in or associated with an activity used is determined using an operation 1103. This calculated percentage is then averaged in existing percentage values as stored in the demand data database 208. At operation 1104, this averaging process is performed. In some cases, new average values will be stored using the operations 1101, and 1105.

The percentage that each keyword is used in an activity data set, as illustrated at operation 1103, is calculated in the following manner. Activity data is collected on a daily basis, data that includes activities such as clicked, bid, bought, or added to watch list activities are associated with keywords used in item titles. These activities are known as constraints. For example, if for the query "iPod nano" 1000 click-throughs are collected and we know the item title of each one, then the occurrence of every unique keyword in this set of titles is calculated. The percentage occurrence of every keyword in the same set is calculated. Thus, if the keyword "charger" occurred in 100 of these 1000 titles, the percentage of charger in the "demand" is 10%. Similarly, if "player" occurs in 950 titles, its demand percentage is 95%. The demand percentages for all the keywords for all the known search queries in the last few weeks may be recorded in some cases.

Figure 12:
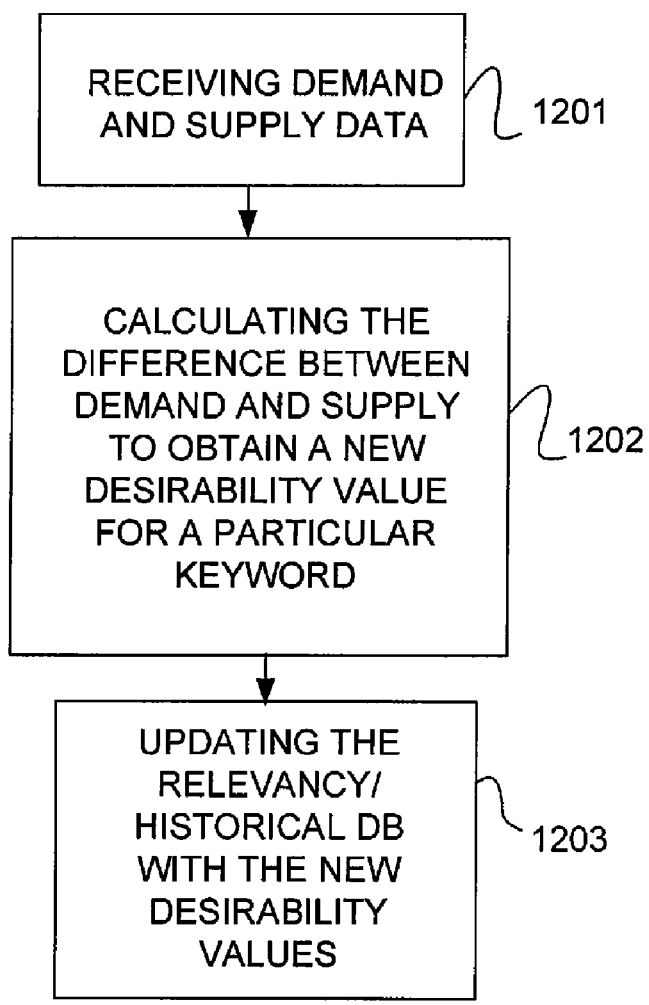
FIG. 12 is an example flow chart illustrating the various processes or operations associated with the relevance engine module, according to an example embodiment.

FIG. 12 is a flow chart illustrating the various operations associated with the relevance engine 209. As illustrated at operation 1201, demand data is received from the demand data database 208, and the supply data is received from the keyword data database 211. Once the demand and supply data is received at operation 1201, the difference between the demand and supply data is determined via an operation 1202. Once this difference is determined, a desirability value will exist or be determined for a particular keyword. This desirability value will then be used by an operation 1203 to update a relevancy or historical data database with new desirability values. This relevancy or historical data database is reference herein as 210.

In some embodiments, as illustrated at operation 1202, the following algorithm (e.g., mathematical equation) to find the difference between demand and supply to determine desirability:

$$\text{Desirability} = \log 2(1.0 + (dw*d)) - \log 2(1.0 + (sw*s));$$

Where:
dw=demand weight;
d=demand percentage (e.g, 0.1 for charger above);
sw=supply weight;
s=supply weight (e.g., 0.9 for charger above);
dw is set to 3 by default, sw is set to 1.

Other implementations of this algorithm can be applied to find the difference between demand values and supply values.

These other implementations may include, for example, finding the difference between demand and supply without using dw, sw, or s for the purposed of weighting, or using some other weighting value. These weighting values may be determined through empirical testing and/or modeling. In some embodiments, this algorithm is implemented in real-time, and on-line to provide real-time or near real-time updating of the data set as it may exist in, for example, a database 210 (see below). In being applied in real-time, this algorithm can facilitate an adaptive system, wherein desirability data is updated to reflect the current supply, demand and desirability values of users (e.g., end user 101) and to adapt to these values. Further, this algorithm may be applied to individual documents (e.g., a web page or web content) such that textual summarization is generated for individual documents, and/or it may be applied to a set of documents.

Figure 13:
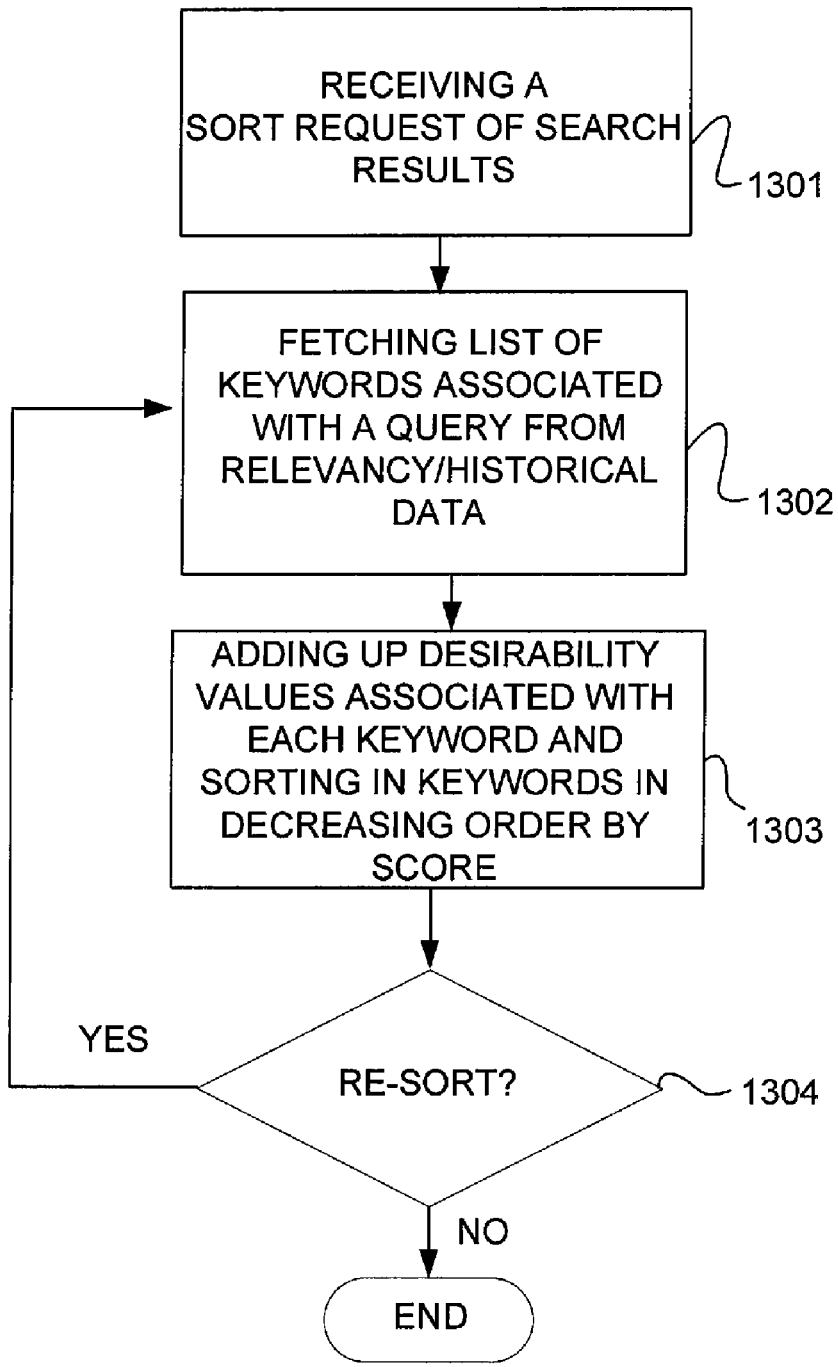
FIG. 13 is an example flow chart illustrating the various processes or operations associated with the sorting engine module, according to an example embodiment.

FIG. 13 is flow chart illustrating the various operations associated with the sorting engine 205. As illustrated at operation 1301, various sort requests are received to sort received search queries or search results. Once this sort request is received, an operation 1302 fetches a list of keywords associated with the query from the relevancy or historical data database 210. Once this list is retrieved, it is provided at an operation 1303 that adds up each desirability score associated with a keyword and sorts the resulting sum of each desirability score and, more to the point, the keyword in a descending order. In some cases, an end user 101 may be prompted via a decisional step 1304 to resort this list wherein an end user 101 may adjust one of the various widgets or objects (e.g., 306, 307, 308, 505, 506, 507, 609, 806, 807, or 808) to sort based upon a new weight. In those cases where a end user 101 requests a resort, the operation 1302 and subsequent operations will be executed.

Example Databases

Figure 14:
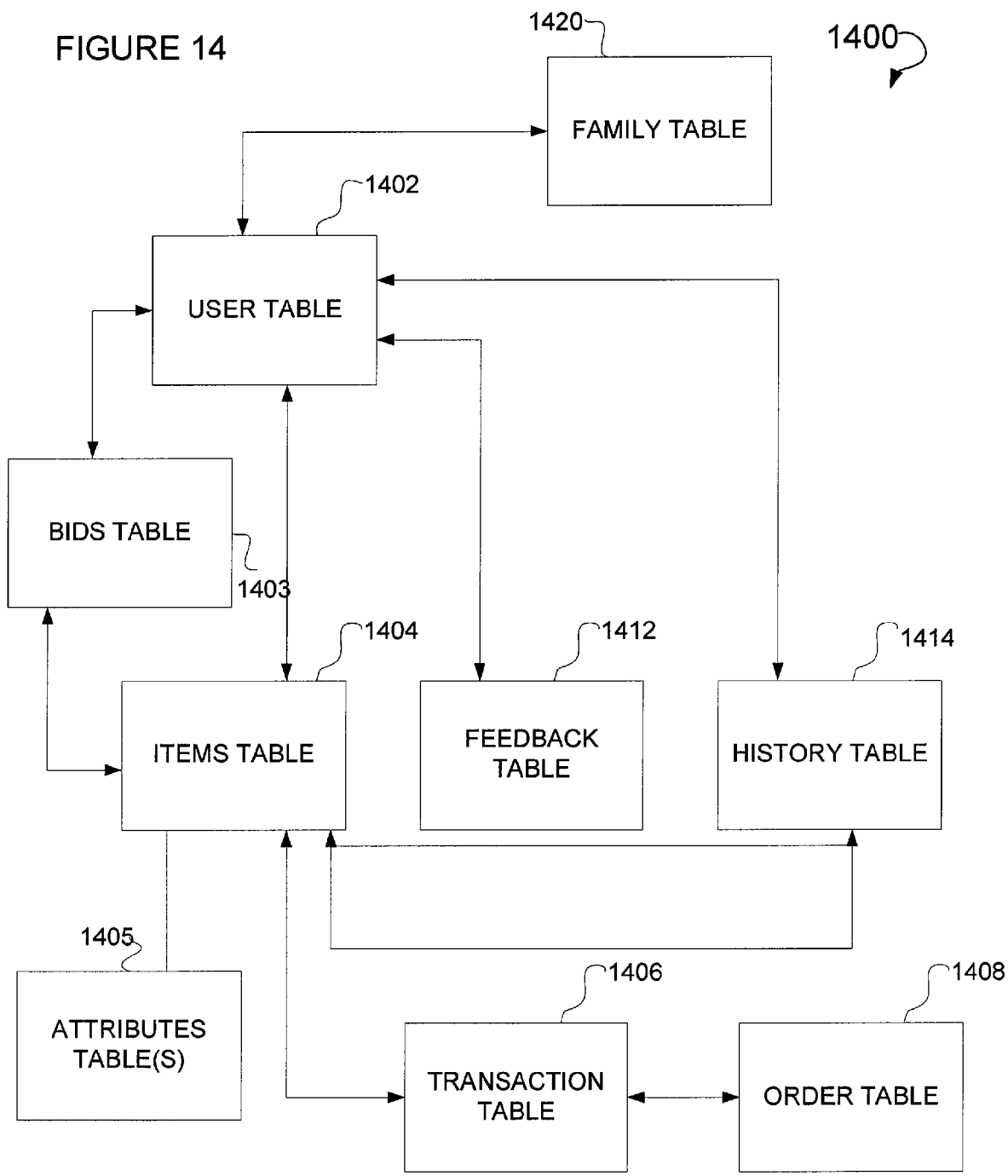
FIG. 14 is an example high-level Relational Data Schema (RDS), illustrating various tables.

FIG. 14 is an example high-level RDS 1400, illustrating various tables that may be maintained within, for example, the databases 108 208, 210, 211 and that are used by and supported by the modules 201, 202, 203, 204, 205, 206, 207, and 209. A user table 1402 contains a record for each registered user of a networked system and may include identifier, address, and financial instrument information pertaining to each such registered user. A user may operate as a publisher, a viewer, or both, within the networked system (see, e.g., networked system 1502 below). In one example embodiment, a viewer may be a user that has accumulated value (e.g., commercial or proprietary currency), and is accordingly able to exchange the accumulated value for publication data that are offered for sale by the networked system 1002.

The RDS 1400 includes a publication data table 1404 in which are maintained publication data records for goods and services that are available to be, or have been, transacted via the networked system. Each publication data record within the items table 1404 may furthermore be linked to one or more user records within the user table 1402, so as to associate a publisher and one or more actual or potential viewers with each publication data record.

A transaction table 1406 contains a record for each transaction (e.g., a purchase or sale transaction) pertaining to publication data for which records exist within the items table 1404.

An order table 1408 is populated with order records, each order record being associated with an order. Each order, in turn, may be recorded with respect to one or more transactions for which records exist within the transaction table 1406.

Bid records within a bids table 1403 each relate to a bid received at the networked system 1002 in connection with an auction-format listing supported by an auction applications 1607. A feedback table 1412 is used by one or more reputation applications 1608, in one example embodiment, to construct and maintain reputation information concerning users. A history table 1414 maintains a history of transactions to which a user has been a party. One or more attributes tables 1405 record attribute information pertaining to publication data for which records exist within the items table 1404. Considering only a single example of such an attribute, the attributes tables 1405 may indicate a currency attribute associated with a particular publication data, the currency attribute identifying the currency of a price for the relevant publication data as specified by a publisher.

A family table 1420, in some embodiments, allows for users to be associated together into family groups. Within this table, user information from the user table 1402 is aggregated together such that queries can be made of groups of users, as opposed to individual users.

In some embodiments, a database 210 contains data related to desirability. Some embodiments may include a table with data relating to an input query (e.g., the name of an item) and various constraints associated with this query such as, for example, the time left in an auction, a particular sellers rating, whether a picture of the item for sale is available, the geographical location of the seller, or some other suitable type of constraint. Further, a field relating to desirability scores provides information relating to the computational results arising from the execution of the desirability engine 209, and specifically the operation 1202. This score is a percentage value relating to all values for that constraint type (e.g., click throughs, user purchases), while in other embodiments, it is a straight number value. The below table illustrates these various fields of data.

| INPUT QUERY (ALL ITEMS FOR WHICH A SEARCH WAS CONDUCTED) | CONSTRAINT TYPE | VALUES BASED UPON DESIREABILTY SCORES DERIVED FROM DESIRABILITY ENGINE |
|---|---|---|
| iPod nano | Clicks | 1.3465 |
| | Range of Prices | .45778 |
| | Title | 1.1109 |
| | Added to Watch List | 1.3335 |
| ELMO ™ | Clicks | .5567 |
| | Range of Prices | .1246 |
| | Title | .6743 |
| | Added to Watch List | .3255 |

Some suitable data type may be used to describe this data including strings, integers, floats, chars, numbers, and a Character Large Objects (CLOB), just to name a few. In some embodiments, various search can be performed on the above table using the aforementioned SQL, or by an application implementing SQL, or some other suitable query language. In some cases, a constraint type field is implemented, whereas in other cases this field is not used. Further, some embodiments may include the updating of these various fields of data in real-time or near real-time in an on-line manner.

Component Design

The above illustrated modules and/or operations performed by these modules may be performed by computer systems configured as a client (e.g., computer system 102, or devices 103), server (e.g., server 107), or peer-to-peer device. These various modules can be implemented on an as-needed basis. These modules may be written in an object-oriented-computer language such that a component-oriented or object-oriented programming technique can be implemented using, a Visual Component Library (VCL), Component Library for Cross Platform (CLX), Java Beans (JB), Java Enterprise Beans (EJB), Component Object Model (COM), or Distributed Component Object Model (DCOM) just to name a few. These modules are linked to another program via various Application Programming Interfaces (APIs) and then compiled into one complete server-client and/or peer-to-peer application. The process for using modules in the building of client-server and/or peer-to-peer applications is well known in the art. These modules may be linked together via various distributed programming protocols as distributed computing modules.

Distributed Computing Modules

In some embodiments, distributed programming is used to implement one or more of the above modules across a distributed programming environment. For example, a keyword search engine 202 may reside on a server 107 that is remotely located from a computer system 102 containing a search module (e.g., 201). These first and second computer systems can be configured in a server-client, peer-to-peer, or some other network topology. These various modules (e.g., 201-207, 209, 210, and 212) can be written using the above illustrated component design techniques, and can be written in the same programming language or a different programming language. Various protocols are implemented to enable these various modules, and the operations executed by each, to communicate regardless of the programming language used to write these components. For example, a module written in C++ using CORBA or SOAP can communicate with another remote module written in JAVA™. These protocols include Simple Object Access Protocol (SOAP), the Common Object Request Broker Architecture (CORBA), or some other suitable protocol. These protocols are well-known in the art.

Platform Architecture

Figure 15:
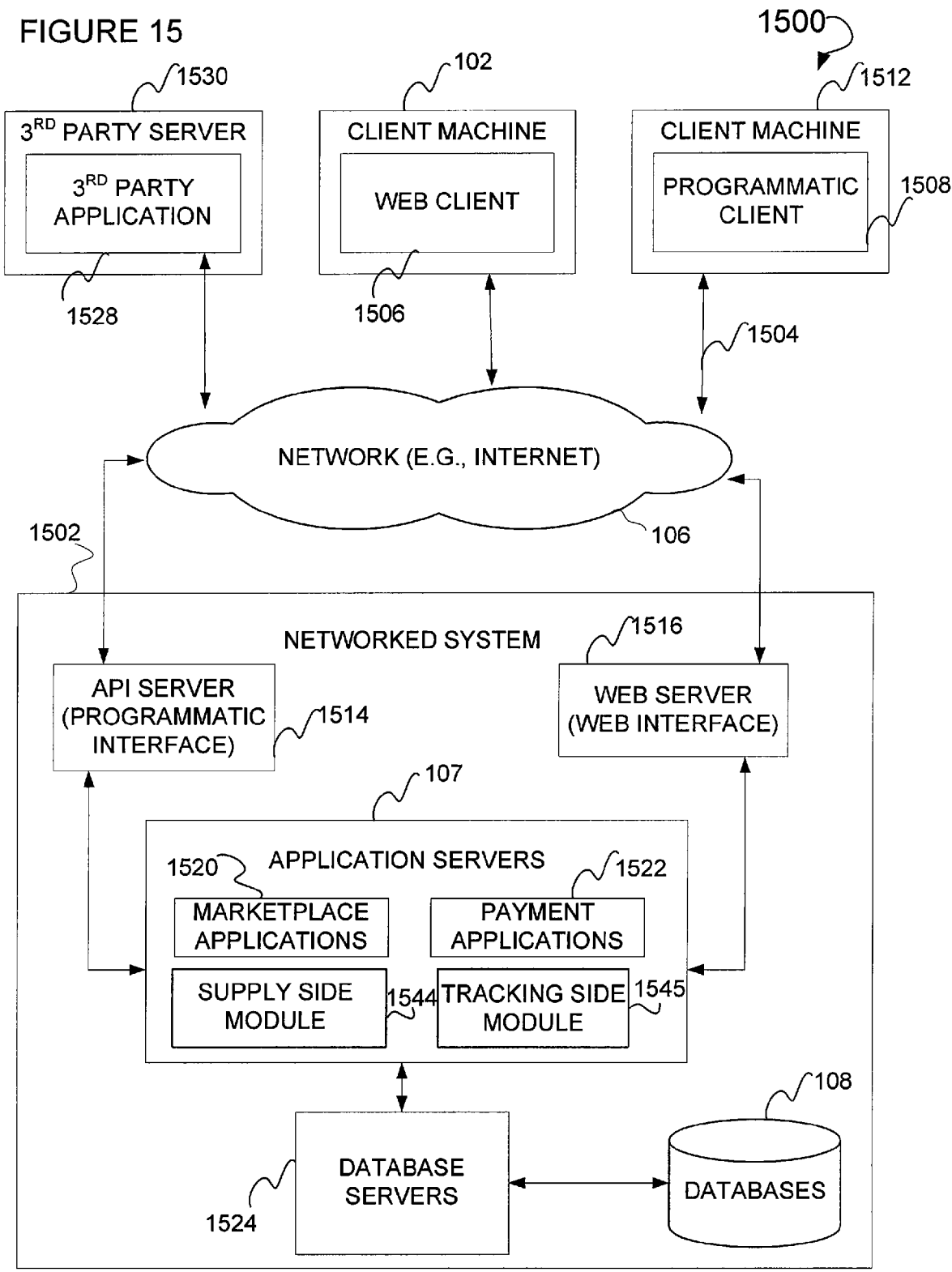
FIG. 15 is an example network diagram illustrating a platform architecture.

In some embodiments, some of the above referenced modules (e.g., 201-207, 209, 210, and 212) are assembled to form a platform architecture. FIG. 15 is an example network diagram illustrating a platform architecture 1500, within which one example embodiment may be deployed. A networked system 1502, in the example, forms a network-based publication system or publication system, provides server-side functionality via a network connection 1504 (e.g., the Internet or wide area network (WAN)) to one or more clients. FIG. 15 illustrates, for example, a web client 1506 (e.g., a browser, such as the INTERNET EXPLORER™ browser developed by Microsoft Corporation of Redmond, Wash. State), and a programmatic client 1508 executing on respective client machines (e.g., computer system 102) and 1512.

An API server 1514 and a web server 1516 are coupled to, and provide programmatic and web interfaces respectively to, one or more application servers 107. The application servers 107 host one or more market place applications 1520 and payment applications 1522. The application servers 107 are, in turn, shown to be coupled to one or more database servers 1524 that facilitate access to one or more databases 108.

Supply side module 1544 may reside on the networked system 1502 as a part of a application server 107. This supply side module 1544 may contain the previously described modules 201, 202, 203, 204, and 205. Additionally, a tracking side module 1545 may reside on the networked system 1502 as a part of the application server 107. This tracking side module 1545 may contain the previously described modules 207 and 209.

In some embodiments, the payment applications 1522 may provide a number of payment services and functions to users (e.g., end user 101). The payment applications 1522 may allow users to accumulate value (e.g., in a commercial currency, such as the U.S. dollar, or a proprietary currency, such as "points") in accounts, and then later to redeem the accumulated value for products (e.g., goods or services) that are made available via the publication system applications 1520. While the publication system 1520 and payment applications 1522 are shown in FIG. 15 both forming part of the networked system 1502, it may be appreciated that, in alternative embodiments, the payment applications 1522 may form part of a payment service that is separate and distinct from the networked system 1502.

Further, while the system 1500 shown in FIG. 15 employs a client-server architecture, the present invention is of course not limited to such an architecture, and could equally well find application in a distributed, or peer-to-peer, architecture system, for example. The various market place applications 1520 and payment applications 1522 could also be implemented as standalone software programs, which do not necessarily have networking capabilities. The web client 1506 accesses the various market place applications 1520 and payment applications 1522 via the web interface supported by the web server 1516. Similarly, the programmatic client 1508 accesses the various services and functions provided by the market place applications 1520 and payment applications 1522 via the programmatic interface provided by the API server 1514. The programmatic client 1508 may, for example, be a publisher application (e.g., the TURBOLISTER™ application developed by eBay Inc., of San Jose, Calif.) to enable publishers to author and manage listings on the networked system 1502 in an off-line manner, and to perform batch-mode communications between the programmatic client 1508 and the networked system 1502.

FIG. 15 also illustrates a third-party application 1528, executing on a third-party server machine 1530, as having programmatic access to the networked system 1502 via the programmatic interface provided by the API server 1514. For example, the third-party application 1528 may, using information retrieved from the networked system 1502, support one or more features or functions on a web site hosted by the third-party. The third-party web site may, for example, provide one or more promotional, publication system, or payment functions that are supported by the relevant applications of the networked system 1502.

Figure 16:
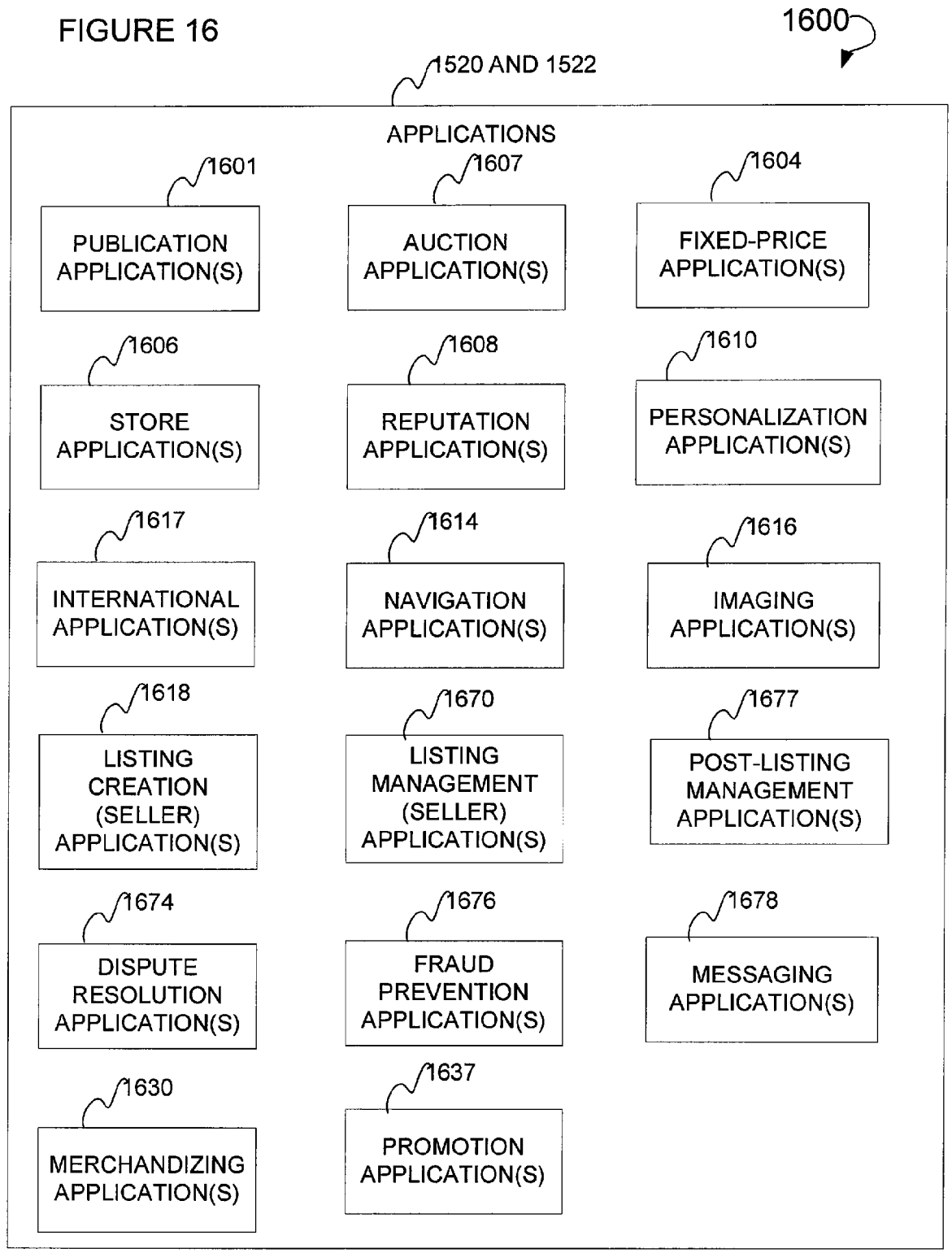
FIG. 16 is a block diagram illustrating multiple applications that may be provided as part of the networked system.

FIG. 16 is a block diagram 1600 illustrating multiple applications (e.g., those making up 1520, and 1522) that, in one example embodiment, are provided as part of the networked system 1502. The applications 1520 may be hosted on dedicated or shared server machines (not shown) that are communicatively coupled to enable communications between server machines. The applications themselves are communicatively coupled (e.g., via appropriate interfaces) to each other and to various data sources, to allow information to be passed between the applications or to allow the applications to share and access common data. The applications may, furthermore, access one or more databases 108 via the database servers 1524.

The networked system 1502 may provide a number of publishing, listing, and price-setting mechanisms whereby a publisher may list (or publish information concerning) goods or services for sale, a viewer can express interest in or indicate a desire to purchase such goods or services, and a price can be set for a transaction pertaining to the goods or services. To this end, the publication system applications 1601 are shown to include at least one publication application 1520 and one or more auction applications 1607 that support auction-format listing and price setting mechanisms (e.g., English, Dutch, Vickrey, Chinese, Double, Reverse auctions etc.). The various auction applications 1607 may also provide a number of features in support of such auction-format listings, such as a reserve price feature whereby a publisher may specify a reserve price in connection with a listing and a proxy-bidding feature whereby a bidder may invoke automated proxy bidding. A number of fixed-price applications 1604 support fixed-price listing formats (e.g., the traditional classified advertisement-type listing or a catalogue listing) and buyout-type listings. Specifically, buyout-type listings (e.g., including the BUY-IT-NOW™ (BIN) technology developed by eBay Inc., of San Jose, Calif.) may be offered in conjunction with auction-format listings and allow a viewer to purchase goods or services, which are also being offered for sale via an auction, for a fixed-price that is typically higher than the starting price of the auction.

Store applications 1606 allow a publisher to group listings within a "virtual" store, which may be branded and otherwise personalized by and for the publisher. Such a virtual store may also offer promotions, incentives, and features that are specific and personalized to a relevant publisher. Reputation applications 1608 allow users that transact using the networked system 1502 to establish, build and maintain reputations, which may be made available and published to potential trading partners. Consider that where, for example, the networked system 1502 supports person-to-person trading, users may otherwise have no history or other reference information whereby the trustworthiness and credibility of potential trading partners may be assessed. The reputation applications 1608 allow a user, for example, through feedback provided by other transaction partners, to establish a reputation within the networked system 1502 over time. Other potential trading partners may then reference such a reputation for the purposes of assessing credibility and trustworthiness.

Personalization applications 1610 allow users of the networked system 1502 to personalize various aspects of their interactions with the networked system 1502. For example, a user may, using an appropriate personalization application 1610, create a personalized reference page at which information regarding transactions to which the user is (or has been) a party may be viewed. Further, a personalization application 1610 may enable a user to personalize listings and other aspects of their interactions with the networked system 1502 and other parties. The networked system 1502 may support a number of publication systems that are customized, for example, for specific geographic regions. A version of the networked system 1502 may be customized for the United Kingdom, whereas another version of the networked system 1502 may be customized for the United States. Each of these versions may operate as an independent publication system, or may be customized (or internationalized) presentations of a common underlying publication system. The networked system 1502 may accordingly include a number of internationalization applications 1617 that customize information (and/or the presentation of information) by the networked system 1502 according to predetermined criteria (e.g., geographic, demographic or publication system criteria). For example, the internationalization applications 1617 may be used to support the customization of information for a number of regional Web sites that are operated by the networked system 1502 and that are accessible via respective Web servers 1516.

Navigation of the networked system 1502 may be facilitated by one or more navigation applications 1614. For example, a search application (as an example of a navigation application) may enable keyword searches of listings published via the networked system 1502. Such a search application may include the relevant algorithm discussed above. A browse application may allow users to browse various category, catalog, or inventory data structures according to which listings may be classified within the networked system 1502. Various other navigation applications may be provided to supplement the search and browsing applications.

In order to make listings available via the networked system 1502 as visually informing and attractive as possible, the publication system applications 1601 may include one or more imaging applications 1616 that users may upload images to, for inclusion within listings. An imaging application 1616 also operates to incorporate images within viewed listings. The imaging applications 1616 may also support one or more promotional features, such as image galleries, that are presented to potential viewers. For example, publishers may pay an additional fee to have an image included within a gallery of images for promoted items.

Listing creation applications 1618 allows publishers conveniently to author listings pertaining to goods or services that they wish to transact via the networked system 1502, and listing management applications 1670 allows publishers to manage such listings. Specifically, where a particular publisher has authored and/or published a large number of listings, the management of such listings may present a challenge. The listing management applications 1670 provides a number of features (e.g., auto-relisting, inventory level monitors, etc.) to assist the publisher in managing such listings. One or more post-listing management applications 1677 also assists publishers with a number of activities that typically occur post-listing. For example, upon completion of an auction facilitated by one or more auction applications 1607, a publisher may wish to leave feedback regarding a particular viewer. To this end, a post-listing management application 1677 may provide an interface to one or more reputation applications 1608, to allow the publisher conveniently to provide feedback regarding multiple viewers to the reputation applications 1608.

Dispute resolution applications 1674 provide mechanisms whereby disputes arising between transacting parties may be resolved. For example, the dispute resolution applications 1674 may provide guided procedures whereby the parties are guided through a number of steps in an attempt to settle a dispute. In the event the dispute cannot be settled via the guided procedures, the dispute may be escalated to a third party mediator or arbitrator.

A number of fraud prevention applications 1676 implement fraud detection and prevention mechanisms to reduce the occurrence of fraud within the networked system 1502.

Messaging applications 1678 are responsible for the generation and delivery of messages to users of the networked system 1502, such messages, for example, advising users regarding the status of listings at the networked system 1502 (e.g., providing "outbid" notices to bidders during an auction process or to provide promotional and merchandising information to users). Respective messaging applications 1678 may use any one of a number of message delivery networks and platforms to deliver messages to users. For example, messaging applications 1678 may deliver electronic mail (e-mail), instant message (IM), short message service (SMS), text, facsimile, or voice (e.g., voice over IP (VoIP)) messages via the wired (e.g., the Internet), plain old telephone service (POTS), or wireless (e.g., mobile, cellular, WiFi, WiMAX) networks.

Merchandising applications 1630 support various merchandising functions that are made available to publishers to enable publishers to increase sales via the networked system 1502. The merchandising applications 1630 also operate the various merchandising features that may be invoked by publishers, and may monitor and track the success of merchandising strategies employed by publishers.

Further, one or more parties that transact via the networked system 1502, may operate loyalty programs that are supported by one or more loyalty/promotions applications 1637. For example, a viewer may earn loyalty or promotions points for each transaction established and/or concluded with a particular publisher, and are offered a reward for which accumulated loyalty points can be redeemed.

Example Use Scenario—General Case

To understand an example implementation, it is helpful to first understand the search results form a typical search query. If, for example, one executes a search for "iPod nano" on a search or publication system, such a query may return all search hits containing both the words "iPod" and "nano." These search results may be quite sub-optimal compared to the search results obtain via implementing one embodiment of the present algorithm. For in the "iPod nano" case, the entire first page is dominated by "iPod nano" accessories, with items having titles like "ipod nano wall charger new," or even "creative a new MP3 player" not "ipod nano."

By contrast, imagine the user either selects a single search result from the previously illustrated set of search results or performs a search using the following result or search query "brand new ipod nano 4 GB black." This search result or query not only contains the keyword "iPod nano," but also contains this keyword in a particular context of other keywords. These other keywords influence future search results. Putting it another way, amongst a list of fifty (50) items on the first page, a user may be visually directed to that specific item because the keywords in the title attracted the user's attention. Keep in mind, that "ipod nano" occurred in all titles, but it was the other keywords in the titles that may have influenced a user's decision to select the relevant instance of publication data (e.g., a listing). Therefore, if a search or publication system filtered by the input query keywords, then it is the remaining keywords in the titles influencing the "desirability" of an item to the user. Therefore, given an input search query, if a search system is aware of the desirability score of one keyword that may appear on publication data (e.g., item titles), the search may calculate the total desirability of every item by adding up the scores of all of its keywords, except those in the input query.

The desirability of something may be a measure of how much users want it, more than how much it is commonly available. If something is in short supply but high in demand, then it becomes "desirable," and the system may have to apply effort to acquire it. Conversely, if something is in high supply but abundantly available, and user demand is low, a system may have to apply some effort to remove it from immediate focus. If something is equally in demand and supply, the system may not need to undertake a positive action and supply and demand are in balance or equilibrium.

Applying these concepts of supply, demand, and desirability to, for example, the E-commerce setting (e.g., buying goods or services on EBAY™), the fact that searching for "iPod nano" may deliver mostly accessories in the results is because supply is heavily skewed by the large number of "iPod nano" accessories listed for sale on EBAY™, compared to the relatively small number of actual "iPod nano" MP3 players. So, extending the demand-supply paradigm to a search on an E-commerce site such as EBAY™, for example, a search system may mathematically calculate the supply, demand, and desirability scores of all keywords, as may be apparent from the following example.

The concept of supply can be illustrated in the following example. In one embodiment, a search of, for example, the EBAY™ listings for the phrase "iPod nano" yields a search result of approximately 30,000 listings that contain the phrase "iPod nano" in their description. If, for example, a second search is performed using the keyword "charger," one may get back results in the form of approximately 6,700 listings. Assuming a random distribution of the keyword "charger" in the universe of approximately 30,000 listings, then there is a 22% chance that a specific listing contains the keyword "charger" (6,700/30,000=22%). This process can be repeated with additional words. For example, assume the search is repeated but this time using the keyword "case." Such a search could yield approximately 11,500 listing such that, assuming a random distribution of this keyword in these listings, there is a 38% chance that a specific listing may contain the keyword "case" (11,500/30,000=38%). And again, repeating the search process using the keyword "MP3 player" yields a result of approximately 1,000 listings such that there is a 3% chance that a listing may contain the keyword "MP3 player" (1,000/30,000=3%). Accordingly, in one embodiment, a search system may ascertain that by doing a traditional search on EBAY™ for "iPod nano," where 50 items are presented on the first page out of 30,000, statistically about 22% or 11 of those may be an "iPod nano charger," about 38% or 19 of those may be an "iPod nano case," and about 3% or 2 items may be an "ipod nano MP3 player."

All the data from the above example embodiment may be collected, for example, by a search system in an automated manner, returning which and how many items match a corresponding search query. This process basically describes the concept of supply (e.g., what we have available to sell in the marketplace).

The concept of demand can be illustrated in the following example. In one embodiment, demand is based upon the number of times a particular listing, or keyword in a listing, is selected by a user from, for example, a list of search results. This process of selection can be by way of some type of input device such as a mouse, keyboard, light pen, touch screen, or other suitable input device and/or GUI widget. For example, if, upon presentation, someone using a mouse were to actually click on a listing for further examination, that would constitute an act or some measure of demand for that item, as something in the visual aspects caused the user to choose it over others. These various user selections are tallied over the course of a week, a month, or some other suitable period of time so as to allow a search system to identify all, or some subset of all users (e.g., individual users), who performed the search "iPod nano," and note the item titles that they did click on, and did conduct further activity with the search result. In some embodiments, over a sufficiently long time period (e.g., day, month, week), a search system may collect thousands of view item "clicks" for that search query. The collection of these clicks or selections is a demand set.

By way of example the total items in demand set for selections (e.g., clicks) generated from a search on "iPod nano" may be 5000 clicks. In some embodiments, in an automated way, the search system may now process all 5000 of these item listing titles and extract the following numbers:

Total items out of those 5,000 that contain the keyword "charger": 20

Total items out of those 5,000 that contain the keyword "case": 30

Total items out of those 5,000 that contain the keyword "MP3 player": 4,900

These total item values are compared to the total universe of all user clicks to ascertain the percentage of items in the demand set containing the above illustrated keywords such that, for example:

keyword "charger": 20/5,000=0.4%
keyword "case": 30/5,000=0.6%
keyword "MP3 player": 4,900/5,000=98%

The desirability of a keyword may be calculated simply as demand versus supply, or mathematically, the difference between demand and supply. These calculations may occur in real-time, and on-line. The table below represents the various values illustrated above and the calculation of the desirability values.

| Keyword | Demand % | Supply % | Desirability |
|---|---|---|---|
| charger | 0.4% | 22% | −21.6% |
| case | 0.6% | 38% | −37.4% |
| MP3 player | 98% | 3% | +95% |

In other embodiments, the search system may use more complicated forms that may allow more complex mathematical function instead of just subtracting supply from demand.

The search system may proceed through all the other keywords that exist in both supply and demand item sets, and calculate and update these scores on a frequent basis for all the search queries that were encountered on, for example, EBAY™ during a certain time period.

The search system may, in the example embodiments, use this data to provide a "relevance" sort to our users. For example, when someone searches for "iPod nano," for all the 30,000 items that occur in the result set (see above), the search system may total the desirability scores of all the other keywords in the title to get the composite relevance score for the item, and then sort all items in decreasing order of this total score. As may be appreciated, items with "charger" or "case" may have a negative total score and this may push them to the end of the 30,000 results; and items with "MP3 player" in the title may be at that top because of a highly positive score. For example, a listing with the title of "MP3 player w/charger and case" would have a composite score of 36% ((−37.4%)+(−21.6%)+95%=36%), where a listing with the title of "MP3 player" would have a composite score of 95%.

Example Use Senario—A Web Based Application

The present invention is implemented via a web-based application using a web browser at the interface level to provide a GUI to a user. As illustrated above, such an implementation may use the modules (e.g., 201-207, 209, 210, and 212) implemented across a distributed or non-distributed architecture using the previously outlined principles of component object design. Collectively these modules could be organized according to the previously illustrated platform architecture 1500.

Previously illustrated example GUIs 301 and 501 illustrate the interface level of a web-based implementation. In addition to the functional aspects of the GUIs, these GUIs provide for some additional purposes and functions. For example, from a publisher's perspective, these GUIs seek to provide publishers (e.g., sellers) with the capability to decorate their publications (e.g., item listings) in a variety of ways. Additionally, these GUIs seek to provide vibrancy in the publication system by allowing more creativity. Moreover, these GUIs allow publishers the ability to do what they legally want to do to maximize profit. Moreover, these GUIs allow for fully free-form data for those publishers that require search functionality.

Another example of the additional purposes and functions provided by these GUIs 301 and 501 is in terms of how they benefit the viewer (e.g., potential purchaser of the goods and services listed). For example, these GUIs seek to provide publication data (e.g., search results, item listings etc) that are relevant to a broad cross-section of viewers. Additionally, these GUIs seek to provide publication data that are up-to-date, accurate, and current with market trends, even in the most non-obvious of places. Moreover, the presentation of the various objects in a particular web-based GUIs can affect, for example maximum average number of clicks before a target event (e.g., a bid placed on an auction process associated with one-listing).

Example Use Senario—A Mobile Device Based Application

In some embodiments, one example use scenario may be in the context of a mobile device such as a cell phone, PDA, or other suitable mobile device (see, e.g., FIG. 6). Such mobile devices have limited space to display information to the end user. Given the small screen size of a mobile device, there is a need to summarize long pieces of text into shorter forms while retaining most of the relevant information. For example, the screen of a popular NOKIA™ cell phone model 3200 has a resolution of 128×128 pixels. With a standard font, it may be possible to only show approximately 20 characters per line and five lines per screen. Given this small screen size, search results may have to be summarized in a different manner such that most relevant keywords are shown to a user.

In some embodiments, an example algorithm operates to perform a method including identifying relevance of each word in a body of text (e.g., using the runtime context), and assigning each word a relevance score. The algorithm sorts these words from the most relevant to the least relevant. The relevance scores of respective words in the body of text may be used to summarize the body of text, for example by showing only the most relevant words (e.g., words having a relevance score exceeding a predetermined threshold) from the body of text, and replacing the less relevant words with some placeholder character such as ".", for example. Multiple placeholder characters may be combined into one. The end result may be a summarized text with highly relevant words visible, and less relevant words hidden.

The predetermined threshold may, in one example embodiment, be a function of the display area (e.g., or display real estate) available on a display device (e.g., mobile telephone screen, computer screen, television screen etc.) for the display of data. For example, where a screen is larger, more keywords may be displayed, with the displayed words displayed based upon relevance. In contrast, where the screen is smaller, fewer keywords may be displayed with only the most relevant keywords being displayed. Put another way, the relevance threshold may be a function of the number of characters displayable per line and the number of lines per screen. This relevance threshold would differ from mobile device to mobile device.

Considering a further example embodiment, there exist many situations in which it may be desirable to summarize long pieces of text into shorter forms, while retaining most of the relevant information. For example, when a user conducts a search (e.g., using an Internet search engine to conduct an Internet-wide search or to conduct a search of a particular web site, such as the EBAY™ web site), it may be desirable to only show the user search results (e.g., items) that strictly meet the user's search criteria. For example, when the search results include an item listing, it is typical to show the item's title, price, and some other information. The item title may be 30 to 40 characters long. Showing the entire title of an item takes much space and reduces the total number of items presentable to the user at a given time.

One way to shorten a piece of text is to simply truncate the text and show only the first few words. The result is not always desirable. For example, an item may have a title "new today Apple ipod nano 4 GB MP3 player black sealed NR free S&H." Applying the truncated approach, the title may be reduced to the first 15 characters with some dots replacing the rest of the title, delivering "new today . . . " This shortened form may not sufficiently communicate to the user what the item is.

To meet the requirement of summarizing long pieces of text into shorter forms while retaining most of the relevant information, one embodiment seeks to summarize text based on (or at least using) the contextual relevancy of each word inside the text.

In one example embodiment, one of the outputs generated by the relevance algorithm is the relevance score for grammatically meaningful portions of a body of text located by a search (e.g., a relevance score for each word that appears in the item title in the result of that query). For example, the query "iPod" yields the following list of words with a corresponding score:

| Apple | (1.39429) |
|-------|-----------|
| MP3 | (1.11403) |
| black | (1.10132) |
| new | (1.08399) |
| player | (1.0662) |
| 4 GB | (0.742288) |
| White | (0.697266) |
| Brand | (0.553271) |
| 2 GB | (0.530753) |
| 5 g | (−0.0569608) |
| 3 g | (−0.0600231) |
| Car | (−0.107664) |
| Video | (−0.117723) |
| Charger | (−0.173231) |

At runtime (e.g., during a real-time, on-line execution), when the relevance algorithm observes or detects a search query originating from another user, the algorithm may retrieve an array of words with respective relevance scores assigned. The relevance algorithm then sorts the words based on the relevance score and applies a configurable threshold value to filter out less relevant keywords. In the above example, the words "Apple," "MP3," and "black" may be determined by the relevance algorithm to be contextually most relevant, based on the relevance scores.

The list of most relevant words may be communicated to a search engine (e.g., search engine 203), or a web page generation module (e.g., module 206) or application, which then proceeds to examine, for example, each item title and replace less relevant words with placeholder characters. For the previous example, the title "new today Apple ipod nano 4 GB MP3 player black sealed NR free S&H" may be summarized to". Apple. BLACK. MP3."

While the above embodiment has been illustrated with respect to textual summarization, it may be appreciated that other embodiments may be applied with respect to other digital content and data (e.g., audio, video, image etc). It may also be appreciated that other contextual information may be taken into account in assigning a relevance score to a digital content item and that the relevant threshold utilized to select digital content items for presentation to a user may be configurable and may be automatically determined by a threshold module of the relevance engine, based on any one of a number of factors (e.g., display area, bandwidth issues, user preference as specified by an appropriate input, user demographic information, temporal information (e.g., time-of-day), and end-user device specifications or type (e.g., television versus mobile device versus computer system)). Display 702 is reflective of this text summarization application in a cell phone or PDA.

A Computer System

The present invention is implemented on a digital processing system or computer system that includes a processor, which may represent one or more processors and may include one or more conventional types of such processors (e.g., x86, x86-64, ARMx), such as an AMD Processor, Intel Pentium or XScale Processor or other suitable Processor. A memory is coupled to the processor by a bus. The memory may be a Dynamic Random Access Memory (DRAM) and/or may include Static RAM (SRAM). The processor may also be coupled to other types of storage areas/memories (e.g., cache, flash memory, disk, etc.), which could be considered as part of the memory or separate from the memory.

In some embodiments, a bus further couples the processor to a display controller, a mass memory or some type of computer-readable medium device, a modem or network interface card or adaptor, and an Input/Output (I/O) controller. The display controller controls, in a conventional manner, a display, which may represent a Cathode Ray Tube (CRT) display, a Liquid Crystal Display (LCD), a plasma display, or other type of suitable display device. Computer-readable medium may include a mass memory magnetic, optical, magneto-optical, tape, and/or other type of machine-readable medium/device for storing information. For example, the computer-readable medium may represent a hard disk, a read-only or writeable optical CD, etc. In some embodiments, a network adaptor card such as a modem or network interface card is used to exchange data across a network such as an Internet. The I/O controller controls I/O device(s), which may include one or more keyboards, mouse/trackball or other pointing devices, magnetic and/or optical disk drives, printers, scanners, digital cameras, microphones, etc.

The present invention may be implemented entirely in executable computer program instructions that are stored on a computer-readable medium or may be implemented in a combination of software and hardware, or in certain embodiments, entirely in hardware.

Embodiments within the scope of the present invention include computer-readable medium for carrying or having computer-executable instructions or data structures stored thereon. Such computer-readable medium may be any available medium, which is accessible by a general-purpose or special-purpose computer system. By way of example, and not limitation, such computer-readable medium can comprise physical storage media such as RAM, Read Only Memory (ROM), Erasable Programmable Read-Only Memory (EPROM), CD-ROM or other optical-disk storage, magnetic-disk storage or other magnetic-storage devices, or any other media that can be used to carry or store desired program code means in the form of computer-executable instructions, computer-readable instructions, or data structures and that may be accessed by a general-purpose or special-purpose computer system. This physical storage medium may be fixed to the computer system, as in the case of a magnetic drive, or removable, as in the case of an Electronically Erasable Programmable Read-Only Memory (EEPROM) device (e.g., flash memory device).

In some embodiments, when information is transferred or provided over a network or another communications connection (e.g., either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable media. Computer-executable or computer-readable instructions comprise, for example, instructions and data that cause a general-purpose computer system or special-purpose computer system to perform a certain function or group of functions. The computer-executable or computer-readable instructions may be, for example, binaries, or intermediate format instructions such as assembly language, or even source code.

In this description and in the following claims, a computer system is defined as one or more software modules, one or more hardware modules, or combinations thereof, that work together to perform operations on electronic data. For example, the definition of computer system includes the hardware modules of a personal computer, as well as software modules, such as the operating system of the personal computer. The physical layout of the modules is not important. A computer system may include one or more computers coupled via a network. Likewise, a computer system may include a single physical device (e.g., a mobile phone or PDA) where internal modules (e.g., a processor and memory) work together to perform operations on electronic data.

Some embodiments may be practiced in network computing environments with many types of computer system configurations, including hubs, routers, wireless Access Points (APs), wireless stations, personal computers, laptop computers, hand-held devices, multi-processor systems, microprocessor-based or programmable consumer electronics, network Personal Computers (PCs), minicomputers, mainframe computers, mobile telephones, PDAs, pagers, or other suitable environment. Some embodiments may be practiced in distributed system environments where local and remote computer systems, which are linked (e.g., either by hardwired, wireless, or a combination of hardwired and wireless connections) through a network, both perform tasks. In a distributed system environment, program modules may be located in both local and remote memory-storage devices (see above).

Figure 17:
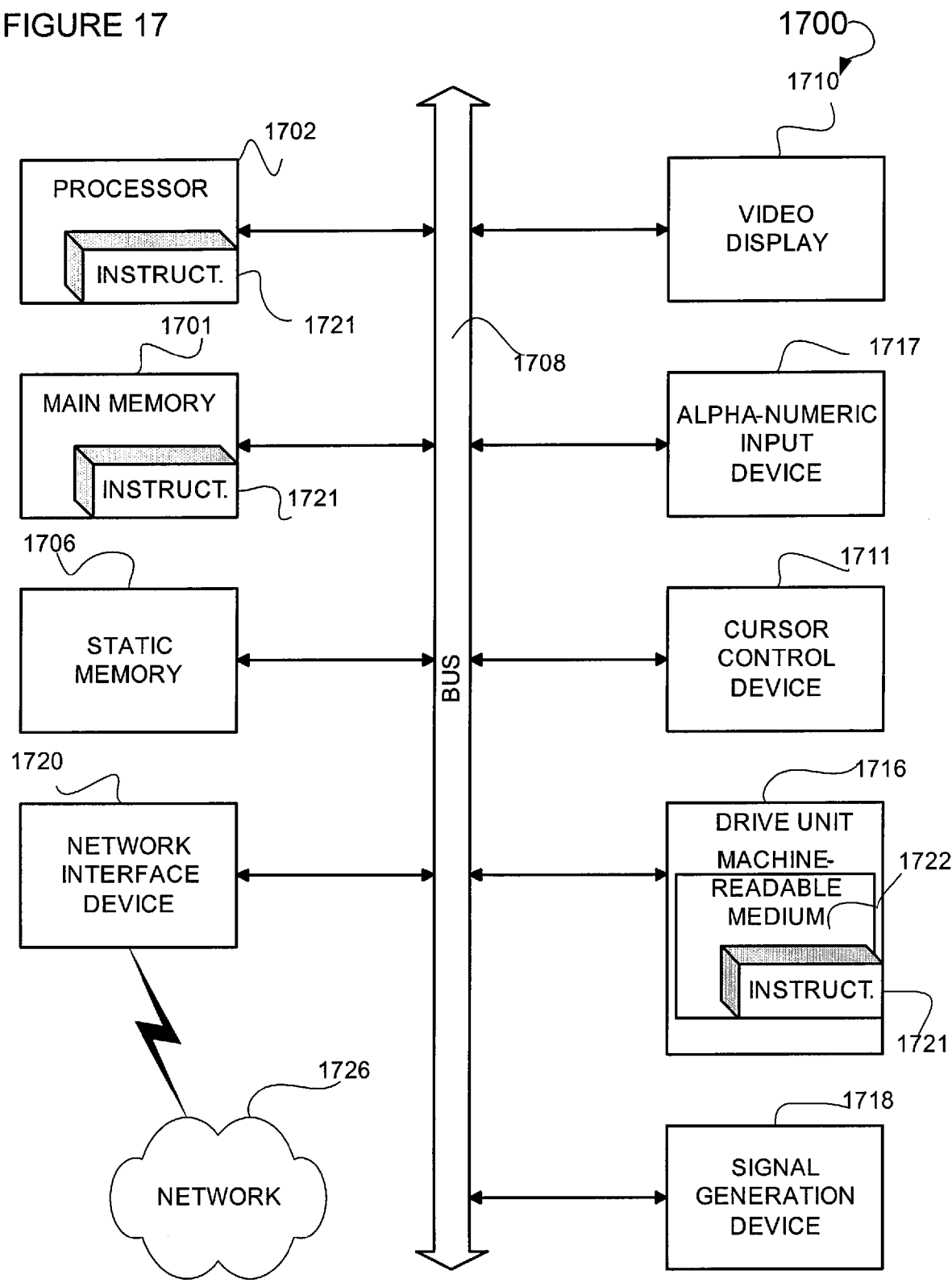
FIG. 17 shows a diagrammatic representation of a machine in the example form of a computer system.

FIG. 17 shows a diagrammatic representation of a machine in the example form of a computer system 1700 within which a set of instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a PC, a tablet PC, a Set-Top Box (STB), a PDA, a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments can also be practiced in distributed system environments where local and remote computer systems, which are linked (e.g., either by hardwired, wireless, or a combination of hardwired and wireless connections) through a network, both perform tasks. In a distributed system environment, program modules may be located in both local and remote memory-storage devices (see below).

The example computer system 1700 includes a processor 1702 (e.g., a Central Processing Unit (CPU), a Graphics Processing Unit (GPU) or both), a main memory 1701 and a static memory 1706, which communicate with each other via a bus 1708. The computer system 1700 may further include a video display unit 1710 (e.g., a LCD or a CRT). The computer system 1700 also includes an alphanumeric input device 1717 (e.g., a keyboard), a user interface (UI) cursor controller 1711 (e.g., a mouse), a disk drive unit 1716, a signal generation device 1718 (e.g., a speaker) and a network interface device (e.g., a transmitter) 1720.

The disk drive unit 1716 includes a machine-readable medium 1722 on which is stored one or more sets of instructions and data structures (e.g., software) embodying or used by any one or more of the methodologies or functions illustrated herein. The software may also reside, completely or at least partially, within the main memory 1701 and/or within the processor 1702 during execution thereof by the computer system 1700, the main memory 1701, and the processor 1702 also constituting machine-readable media.

The instructions 1721 may further be transmitted or received over a network 1726 via the network interface device 1720 using any one of a number of well-known transfer protocols (e.g., HTTP, Session Initiation Protocol (SIP)).

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any of the one or more methodologies illustrated herein. The term "machine-readable medium" shall accordingly be taken to include, but not be limited to, solid-state memories, optical and magnetic media, and carrier wave signals.

It is to be understood that the above description is intended to be illustrative and not restrictive. Although numerous characteristics and advantages of various embodiments as illustrated herein have been set forth in the foregoing description, together with details of the structure and function of various embodiments, many other embodiments and changes to details may be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

The Abstract of the Disclosure is provided to comply with 37 C.F.R. §1.72(b), requiring an abstract that may allow the reader to quickly ascertain the nature of the technical disclosure. It is submitted with the understanding that it may not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
   a hardware-implemented receiver to receive a search query;
   a first hardware-implemented associator to associate a first numerical value with a first keyword that is a part of the search query, the first numerical value representing a percentage of times the first keyword is referenced in a plurality of search queries;
   a hardware-implemented tracker to track user activity associated with the first keyword;
   a second hardware-implemented associator to associate a second numerical value with the first keyword based upon the user activity, the second numerical value representing a percentage of times user activity is associated with the first keyword relative to a plurality of user activities;
   a hardware-implemented calculator to determine a difference value between the first and second numerical values, and to associate the difference value with the first keyword;
   a hardware-implemented sorter to sort a plurality of keywords based upon respective difference values associated with each keyword of the plurality of keywords; and
   a hardware-implemented outputer to output a result of the sort.

2. The system of claim 1, wherein the hardware-implemented receiver includes a Graphical User Interface (GUI).

3. The system of claim 1, further comprising:
   a second hardware-implemented receiver to receive a search query;
   a hardware-implemented extractor to extract keywords from the search query;
   a hardware-implemented adder to add the extracted keywords to existing keywords;
   a hardware-implemented re-calculator to re-calculate a percentage value relating to each keyword, the percentage value representing a percentage of search queries that each of the existing keywords has been used in a plurality of searches; and
   a hardware-implemented storage operatively to store the re-calculated percentage value into a keyword database.

4. The system of claim 3, wherein the hardware-implemented re-calculator is to re-calculate the percentage value based upon each keyword and a probability of an appearance in a search query result by the keyword.

5. The system of claim 1, further comprising:
   a second hardware-implemented receiver to receive activity data;
   a hardware-implemented extractor to extract a second keyword from the activity data to create an activity data set;
   a hardware-implemented calculator to calculate a percentage the second keyword is used in the activity data set;
   a hardware-implemented averager to computer a new average based upon averaging in the percentage to an existing user activity percentage stored in a demand database, the activity percentage reflecting user activity relating to the second keyword relative to activity relating to a plurality of keywords; and
   a hardware-implemented storage operatively coupled to the server to store the new average value into a keyword database.

6. The systems of claim 1, wherein user activity is selected from the group consisting of clicks, user bids, purchases, and added to watch list activities.

7. The system of claim 1, further comprising the hardware-implemented tracker to track user activity associated with the first keyword, the user activity tracked based upon a predefined criteria including a period of time, and after recording a predefined number of user actions.

8. The system of claim 1, further comprising a hardware-implemented updator to update a database with the difference value.

9. The system of claim 1, further comprising:
   a second hardware-implemented receiver to receive a sort request of search results;
   a hardware-implemented fetcher to fetch a list of keywords associated with the search results from a database; and
   a hardware-implemented adder to add up desirability values associated with each keyword.

10. The system of claim 1, wherein the first numerical value is a demand value.

11. The system of claim 1, wherein the second numerical value is a supply value.

12. The system of claim 1, wherein the difference value is a desirability value.

13. A method comprising:
    using a hardware-implemented associator to associate a first numerical value with a first keyword that is a part of a search query, the first numerical value representing a percentage of times the first keyword is referenced in a plurality of search queries;
    using a hardware-implemented tracker to track user activity associated with the first keyword;
    using a second hardware-implemented associator to associate a second numerical value with the first keyword based upon the user activity, the second numerical value representing a percentage of times user activity is associated with the first keyword relative to a plurality of user activities;
    using a hardware-implemented calculator to find a difference value between the first and second numerical values, and to associate this difference value with the first keyword;
    using a hardware-implemented sorter to sort keywords based upon the difference values; and
    using a hardware-implemented outputer to output results of the sorting.

14. The method of claim 13, including receiving of the search query through a Graphical User Interface (GUI).

15. The method of claim 13, further comprising:
    using a hardware-implemented extractor to extract keywords from the search query;
    using a hardware-implemented adder to add the extracted keywords to existing keywords;
    using a hardware-implemented re-calculator to re-calculate a percentage value relating to each keyword, the percentage value representing a percentage of search queries that each of the existing keywords has been used in a plurality of searches; and
    using a hardware-implemented storage to store the re-calculated percentage values into a keyword database.

16. The method of claim 15, further comprising using a hardware-implemented re-calculator to re-calculate the percentage value based upon each keyword and a probability of appearance in a search query result by the keyword.

17. The method of claim 13, further comprising using a tracker to track user activity associated with the first keyword, the user activity tracked based upon a predefined criteria including a period of time, and after recording a predefined number of user actions.

18. The method of claim 13, further comprising:
using a hardware-implemented receiver to receive activity data;
using a hardware-implemented extractor to extract a second keyword from activity data to create an activity data set;
using a hardware-implemented calculator to calculate a percentage the second keyword is used in the activity data set;
using a hardware-implemented average to average in the percentage to an existing user activity percentage stored in a demand database to generate a new average value, the activity percentage reflecting user activity relating to the second keyword relative to activity relating to a plurality of keywords; and
using a hardware-implemented storage to store the new average value into a keyword database.

19. The method of claim 13, wherein user activity is at least one of clicks, user bids, purchases, or added to watch list activities.

20. The method of claim 13, further comprising updating a database with the difference value.

21. The method of claim 13, further comprising:
using a hardware-implemented receiver to receive a sort request of search results;
using a hardware-implemented fetcher to fetch a list of keywords associated with the search results from a database; and
using a hardware-implemented adder to add up difference values associated with each keyword.

22. The method of claim 13, wherein the first numerical value is a demand value.

23. The method of claim 13, wherein the second numerical value is a supply value.

24. The method of claim 13, wherein the difference value is a desirability value.

* * * * *

UNITED STATES PATENT AND TRADEMARK OFFICE
CERTIFICATE OF CORRECTION

PATENT NO. : 7,814,112 B2 Page 1 of 1
APPLICATION NO. : 11/679973
DATED : October 12, 2010
INVENTOR(S) : Raghav Gupta et al.

It is certified that error appears in the above-identified patent and that said Letters Patent is hereby corrected as shown below:

In column 4, line 30, after "below)" insert -- . --.

In column 23, line 52, delete "Senario" and insert -- Scenario --, therefor.

In column 24, line 22, delete "Senario" and insert -- Scenario --, therefor.

In column 29, line 65, in Claim 5, delete "computer" and insert -- compute --, therefor.

In column 31, line 19, in Claim 18, delete "average to average" and insert -- averager to average --, therefor.

Signed and Sealed this

Twenty-first Day of December, 2010

David J. Kappos
*Director of the United States Patent and Trademark Office*